April 19, 1960  S. SALEM ET AL  2,932,901

METHOD AND APPARATUS FOR TREATING FIBER CORDS

Filed July 9, 1954  6 Sheets-Sheet 1

INVENTORS
*Samuel Salem*
*Rollin H. Spelman*
BY *Evans + McCoy*
ATTORNEYS

April 19, 1960
S. SALEM ET AL
2,932,901
METHOD AND APPARATUS FOR TREATING FIBER CORDS
Filed July 9, 1954
6 Sheets-Sheet 2
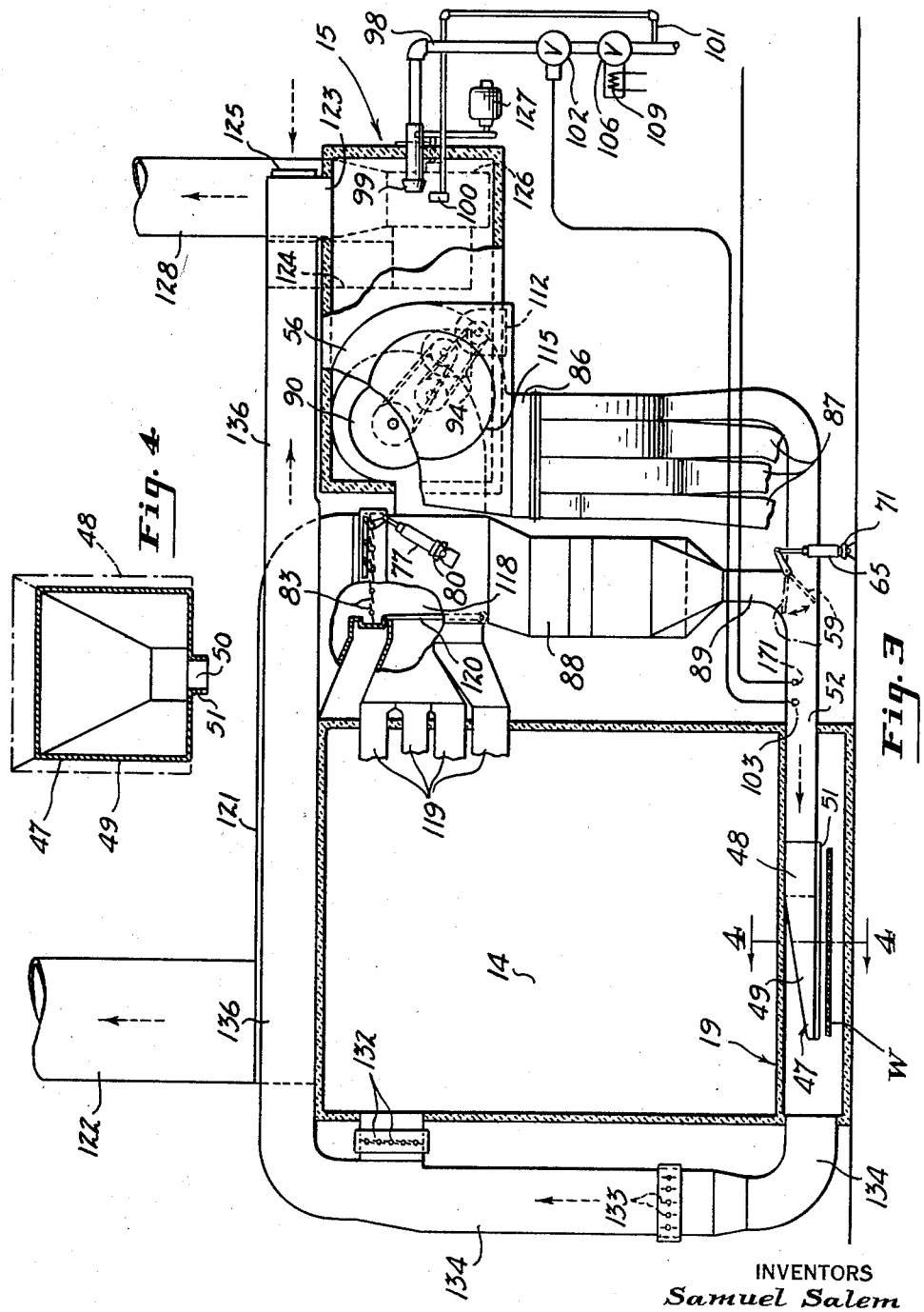
INVENTORS
Samuel Salem
Rollin H. Spelman
BY Evans + McCoy
ATTORNEYS

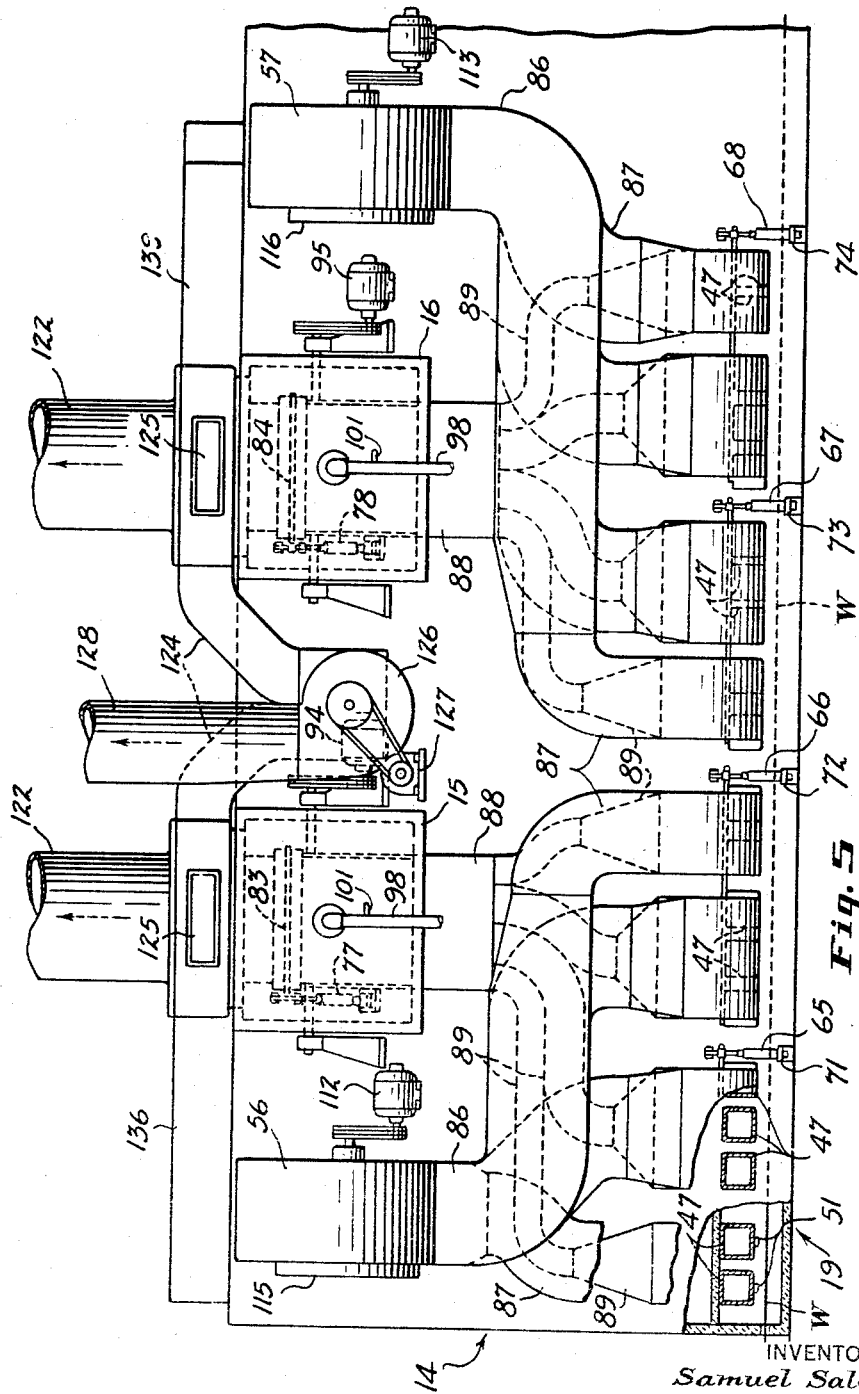

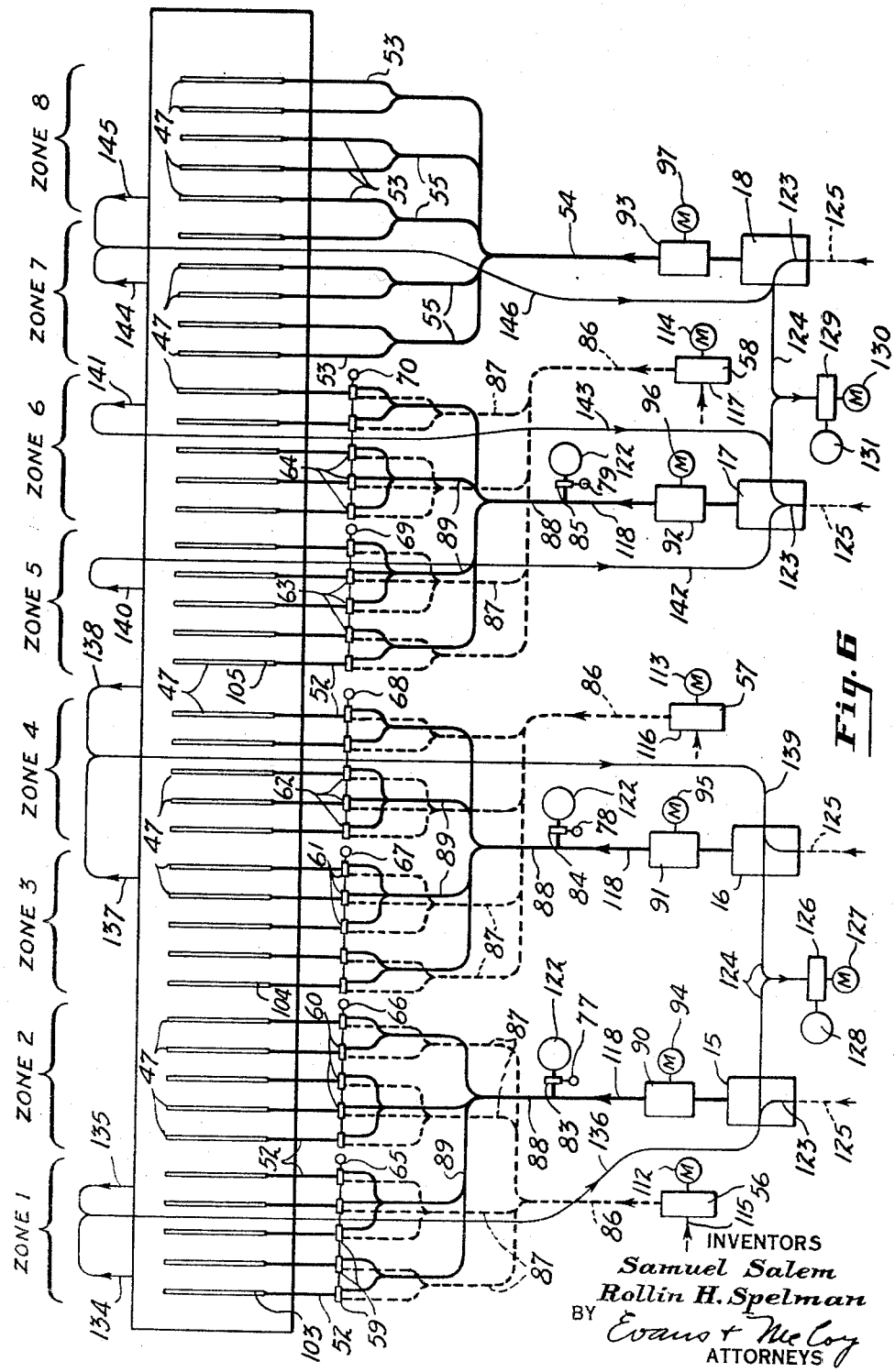

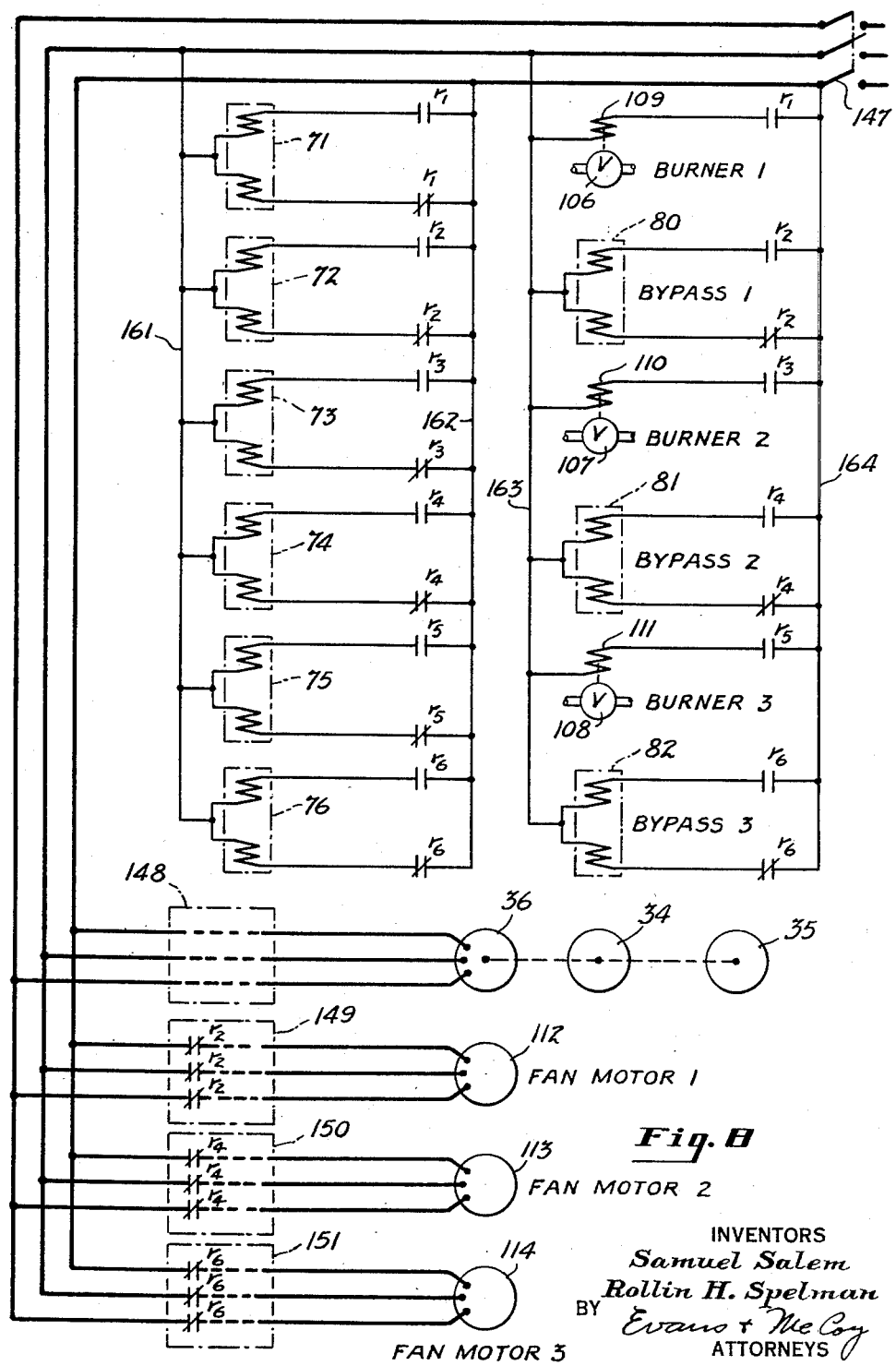

2,932,901

METHOD AND APPARATUS FOR TREATING FIBER CORDS

Samuel Salem and Rollin H. Spelman, Akron, Ohio, assignors to The General Tire and Rubber Company, Akron, Ohio, a corporation of Ohio Application July 9, 1954, Serial No. 442,364

15 Claims. (Cl. 34—23)

The present invention relates to a method of and apparatus for treating fiber cord material and more particularly to the treatment of nylon, Dacron, Perlon or similar synthetic fiber cords for use in rubber tires and other reinforced rubber products.

Cords of nylon or the like tend to grow or elongate permanently when subjected to tension while at normal temperatures. For this reason it has been a problem to prevent permanent growth of tire carcasses that are reinforced with nylon, Perlon, or similar synthetic fiber material. Such growth may be minimized by pre-stretching the cords before they are placed in the tire.

It has been found that cords of the highest quality and least tendency to grow are produced when the cords are heated while being stretched or tensioned so as to reorganize the molecular structure of the cords, best results being obtained when the cords are treated under accurate tension, temperature and elongation conditions. However, cords of nylon or the like are elastic when heated and tend to shrink if tension thereon is removed. Such shrinkage is reduced by cooling the cords rapidly after they are stretched and before the tension is removed. The heating and cooling of fiber cords while under high tension is called a "hot-stretching process."

In order to satisfactorily adhere the cords to the rubber of the tire it is necessary to dip the cords in a suitable fabric to rubber adhesive and to dry the cords before completing the hot-stretch process.

According to a method of the present invention, the fiber cords are wetted with water or other liquid which leaves no residue upon evaporation, the excess liquid is removed in any suitable manner, and the cords are subsequent dipped in a latex adhesive or the like. The excess dip solids and liquids are then removed in any suitable manner and the cords are passed through a plurality of heating zones while simultaneously being stretched and subjected to a substantial tension. The cords are cooled before the tension is released and before the cords have been subjected to heat for an undue period of time to prevent excessive shrinking of the cords thereafter. The water contained in the cords is evaporated in the heating zones of a drying oven and leaves substantially no residue in the cords. As a result, the latex adhesive does not penetrate into the central portion of the cords so as to stiffen the cords unduly but adheres to the outer surface of the cords. It has been found that cords made by this hot-stretching process are superior to dipped cords normally used in the manufacture of rubber tires because they have increased flexibility and greater flex life. Furthermore, the novel dipping process effects a substantial saving of latex adhesive by reducing the penetration of the latex into the cord. Where previously it has been customary for nylon cords to increase up to about seven or eight percent in weight after being dipped in latex adhesive and dried according to former methods, it has been discovered that satisfactory adhesion of nylon to rubber can be obtained where the cords increase in weight only about two percent due to the latex. By the use of a water dip, it is possible to reduce the increase in weight due to the pickup of latex to about two or three percent, the water picked up by the cords being evaporated in the drying oven.

Another method of reducing the penetration of the adhesive into the cords is to employ higher tensions during dipping. Although satisfactory results are obtained by employing just sufficient tension during dipping to prevent substantial shrinking of the cords, it is preferable to employ a slightly greater tension to reduce penetration. Where nylon cords are treated, satisfactory results are obtained when the stretch during dipping is between about −2% and +2%, but it is preferable to stretch the cords about 1 or 2% during dipping to reduce the penetration. According to the present invention the synthetic fiber cords are passed at a predetermined velocity through a plurality of successive heating zones, each of which is preferably provided with means to direct hot gases at a predetermined temperature over the synthetic fiber cords. Means are also provided to vary the speed of the cords passing through the heating zones and to vary the number or length of the zones being heated whereby the length of time the cords are heated by the hot gases may be regulated by controlling the speed of the cords and/or the length of the heating zones.

Immediately after the cords have been dried and heated for the desired length of time in the heating zones, they are cooled as quickly as possible to a temperature below 150° F. to set the same and to prevent excessive shrinking of the cords. This cooling is preferably effected by directing high velocity air over the cords immediately after they leave the heated zones, this air being usually at substantially atmospheric temperature. Where the number of zones being heated by the hot gases is reduced, it is preferable to cool rapidly the unheated zones downstream of the heated zones with high velocity air. In this way the unheated zones may be quickly purged of hot gases so that the cords are not overheated for an undue length of time when the speed of the cords is reduced. Likewise, the zones may quickly be heated with high velocity gases when the speed of the cords is increased.

During heating of nylon cords or the like by the hot gases and the cooling of said cords by atmospheric air in the drying oven, it is preferable to apply a considerable tension to the cords. Excellent results are obtained by heating the cords for a predetermined time with high velocity gases at a predetermined temperature to obtain a predetermined heat transfer while simultaneously subjecting the cords to a predetermined tension and cooling the cords with air before the tension is released. Therefore, it is important to control the temperature and velocity of the hot gases, the speed of the cords and the tension thereon during travel through the heating and cooling zones, and the number or length of the heating zones. Good results are obtained when the temperature in the zones being heated is maintained constant and the speed of the cords is maintained proportional to the number of zones being heated.

When it becomes desirable to reduce the amount of synthetic fiber cord being treated in any given period of time, the speed of the cords and the number of zones being heated in the drying oven may be reduced until such time as it becomes desirable to increase the amount being treated. Since the unheated zones may be quickly purged of hot gases and cooled, the cords will not be overheated for an undue length of time if their speed is reduced at the instant cooling is initiated. According to the present invention, the speed of the cords, the number of zones heated, and the temperature in the heated zones is automatically correlated so as to ensure that the cords are heated uniformly and for the proper period of time. It is preferable to provide an oven having thermostatic means responsive to the temperature in each of the heating zones to prevent an increase in the speed of the cords through the oven until a sufficient number of zones are heated above a minimum temperature.

The ovens of the present invention are adapted to treat various fiber cords by heating the cords for predetermined periods of time with gases at predetermined temperatures while stretching the cords predetermined amounts. It is preferable to maintain the gas temperature at least 30° F. below the melting point of the cords. The hot-stretching process results in a change in the molecular structure of the cords and is designed to produce cords which have a high modulus of elasticity and which have sufficient tenacity and fatigue life for use in pneumatic tires.

While an increase in the time of exposure increases the modulus of the finished cords, excessive exposure to heat deteriorates the cords and lowers the tenacity and the fatigue life of the finished cords. The apparatus of the present invention is designed to obtain cords having both a high modulus and a high tenacity or tensile strength. The time of exposure is correlated with the temperature of the gases so as to obtain cords of the highest quality.

When nylon is treated the exposure time is preferably below about 30 seconds since there is an excessive loss in tenacity when nylon is heated to a high temperature for a longer period of time.

Of course it will be understood that the exposure time to provide the optimum tenacity or tensile strength and optimum fatigue life will depend on the gas temperature. Where nylon may be heated with gases at a temperature of about 350° to 375° F. for about 30 seconds, to obtain satisfactory results the time of exposure should be reduced to about 12 seconds where the gas temperature is increased to about 450° F.

After the cords are hot-stretched and cooled, the net stretch or the amount of applied stretch that is retained will depend upon the temperature of the cords, the length of time they had heated, and the amount of stretch applied during heating. When cords are treated according to the methods of the present invention the net stretch or retained stretch depends primarily on the amount of plastic stretch occurring during the hot-stretching process. The applied stretch, of course, is substantially equal to the elastic stretch plus the plastic stretch. To obtain the plastic stretching it is necessary to heat the cords to a temperature approaching that at which rapid plastic flow occurs and at least about 50° F. lower than the melting point of the cords. According to the present invention nylon cords are heated and stretched sufficiently so that they have a net stretch after cooling of about 6 to 13% and preferably at least 8%.

When fiber cords are passed through dip tanks containing a latex adhesive or the like, sufficient tension should be applied to the cords to prevent more than about 2% shrinkage, but the cords are preferably stretched less than about 2% during dipping. If desired tensioning rolls may be provided between the dip tanks and the drying portion of the oven and a high tension may be applied both during drying and during hot stretching of the cords. However, according to the present invention cords may be dipped and dried while under a low tension sufficient to prevent substantial shrinking of the cords in which case tensioning rolls between the dip tanks and the drying oven may be eliminated. It is preferable, when dipping and drying nylon cords at the same low tension, to apply a tension sufficient to stretch the cords about 1 or 2 percent. After the cords are dried at least about 85 percent, a high tension may be applied to stretch the nylon cords at least about 10 percent.

An object of the invention is to provide a simple method of and apparatus for heating and cooling synthetic fiber cords with gases at high velocity while the cords are being stretched so as to obtain cords of the highest quality.

A further object of the invention is to provide a method of and apparatus for varying the amount of fiber cord material treated in any given period of time while maintaining a predetermined relationship between the tension applied to the cord, the temperature to which the cord is heated, and the time that the cord is heated to that temperature.

Another object of the invention is to provide apparatus for assuring adequate heating and for preventing overheating of the fiber cord material as its rate of movement is varied.

An object of the invention is to provide an oven for fiber cord having as short a warm up time as possible so as to obtain a cord of more uniform properties when the speed of the cord is varied.

A further object of the invention is to provide a method for insuring adequate heating of the more closely spaced warp cords of a weak-weft fabric web that is subjected to substantial tension.

Other objects, uses and advantages of the present invention will become apparent from the following description and from the drawings in which:

Fig. 3 is an end elevational view partly in section and with parts broken away taken on the line indicated at 3—3 in Fig. 1;

Fig. 4 is a sectional view of one of the nozzles taken on the line indicated at 4—4 in Fig. 3;

Fig. 5 is a fragmentary side elevational view of the nylon-rayon process oven showing the apparatus associated with the first four heating zones thereof;

Fig. 6 is a diagrammatic plan view of the nylon-rayon drying oven illustrated in Figs. 1 to 5;

Fig. 8 is another diagrammatic view of an electrical control system that may be used with the oven shown in Figs. 1 to 6.

Referring more particularly to the drawings in which like parts are identified by the same numerals throughout the several views, Figs. 1 to 6 show a process oven for treating nylon, rayon, Dacron, or similar synthetic fibers. The oven shown herein is adapted to treat either nylon or rayon cords by applying a latex adhesive or other suitable adhesive thereto, heating the cords to dry the same, and heating and cooling the cords under tension to reorganize the molecular structure of the cords and set the same. Separate portions of the oven are used to heat the nylon and the rayon, but much of the mechanism in the oven that is utilized when nylon is being treated may be used when rayon is being treated and vice versa.

Figure 2:
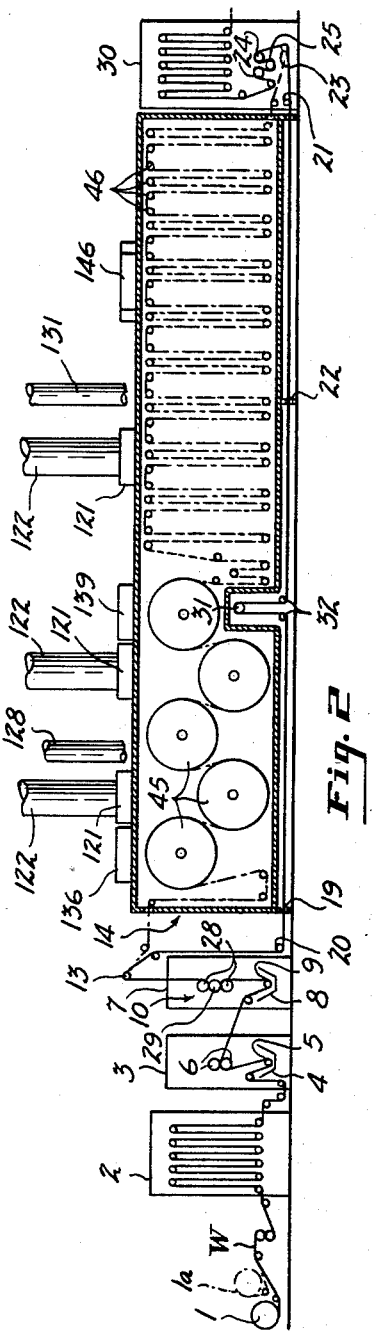
Fig. 2 is a side elevational view partly in section taken on the line indicated at 2—2 in Fig. 1.

Since the present invention is concerned primarily with the portion of the oven that is adapted to treat nylon or the like, a detailed description of the rayon treating portion of the oven is unnecessary. However, the dotted lines in Fig. 2 show the general path followed by the rayon when it is treated in the oven.

Before cords of nylon, rayon, Dacron, or similar synthetic fibers are treated in the nylon-rayon process oven shown in the drawings, they are twisted and woven to form a fabric web of uniform width that may be wound on suitable supply rolls. The cords usually have a length of several hundred feet and are usually held in mutually parallel relation in the fabric web by transverse woof or tie threads forming the weft. These threads usually have a length several times the width of the web and are preferably relatively weak with respect to the long parallel cords forming the warp so as to provide a pick-weave or weak-weft fabric suitable for the manufacture of rubber tire carcasses and similar reinforced rubber articles. However, the presence of woof or tie threads does not substantially alter the effectiveness of the process disclosed herein.

It will be understood that an oven of the type described could also be used for weftless full-width nylon fabric although such fabric is not as yet used extensively in the United States.

The oven shown herein is adapted to treat a woven nylon weak-weft fabric web with a width of from about 48 to 72 inches. Such a web may be made up, for example, by 840/2 denier nylon cords (two 840 denier cords twisted together about 12 to 13 times to the inch) with a tensile strength well over 25 pounds. The transverse woof or tie threads, on the other hand, may have a tensile strength as low as one-half pound. A nylon fabric web of this type with a normal width of 58 inches may contain around 1800 of these 840/2 denier cords. If a tension of 5 pounds is applied to each of these cords, (9000 pounds tension on the web) the web will probably stretch about fifteen percent.

The nylon-rayon process oven shown in Figs. 1 to 6 is designed for treating cord fabric webs that are to be used in building rubber tires or like rubber articles. In order to obtain satisfactory adhesion between the nylon or the rayon fabric and the rubber, it has been found necessary to apply an adhesive to the surface of the fabric. Various fabric to rubber adhesives are available which give the desired degree of adhesion to synthetic fibers, such as nylon, rayon, Dacron, or the like, while permitting retention of the flexibility of the cords that is so vital to the life of such products as pneumatic tires, fabric-reinforced belting for conveyors and mechanical drives, and the like. For example, a latex adhesive containing partially condensed resorcinol formaldehyde might be used or a terpolymer adhesive containing 2-vinyl pyridine.

It has been found that copolymers of various conjugated diolefinic compounds having up to seven carbon atoms with 2-vinyl pyridine with or without additional mono-olefinic compound such as styrene, isopropenyl ketone, etc. have excellent adhesive properties for joining natural and some synthetic fibers to rubber. When combined with resorcinol and formaldehyde, their adhesion to nylon is also very good. Diolefinic compounds suitable for this purpose include the following monomers: butadiene, dimethyl-butadiene, chloroprene, and isoprene. Such adhesives suitable for the present invention are described in the Mighton Patent No. 2,561,215 and Mallory et al. Patent No. 2,615,826.

It has also been found that a practical and inexpensive latex adhesive may be provided by substituting styrene for part of the 2-vinyl pyridine, the preferable proportion of styrene to 2-vinyl pyridine, from the performance standpoint, being in the vicinity of 3:2. However, very good results may be obtained with a ratio of styrene to 2-vinyl pyridine as low as 1:4 or as high as 2:1. The highest possible proportion of styrene may be most desirable from the cost standpoint in view of the undesirably high cost of 2-vinyl pyridine. Where economy is the controlling consideration, the lowest amount of 2-vinyl pyridine which will give the required bond strength will be selected.

While it appears that the quantities and proportions of monomers employed are governed by no clearly defined limits, the practical operative ranges appear to be about as follows:

|  | Percent |
|---|---|
| 2-vinyl pyridine | 5 to 30 |
| Styrene | 5 to 30 |
| 2-vinyl pyridine plus styrene | 10 to 35 |
| Polymerizable diolefine | Balance |

The preferred ranges are substantially as follows:

|  | Percent |
|---|---|
| 2-vinyl pyridine | 5 to 15 |
| Styrene | 10 to 20 |
| 2-vinyl pyridine plus styrene | 15 to 30 |
| Polymerizable diolefine | Balance |

The polymerizable diolefine may be butadiene, but any polymerizable conjugated diolefine having up to 7 carbon atoms may be used in the molecule in place of butadiene as the major constituent of the adhesive. For example, mixtures of two or more of such diolefines or other conjugated diolefinic compounds, such as isoprene, chloroprene, and 1-cyano-butadiene-1,3 may also be used, alone or in admixture, with the above diolefines when desired to provide adhesives especially suited for bonding fibers to certain synthetic rubber compositions.

Tests have shown that a latex adhesive of the type described above provides strong adherence between the fabric and the rubber and also high resistance to deterioration of the bond with flexing of the structure. Therefore, in order to increase the fatigue resistance of a pneumatic tire and the flex-life of the tire carcass, it is preferable to employ a latex adhesive such as "Gen-Tac" when treating tire cords in the oven of the present invention.

"Gen-Tac" is a latex adhesive developed by The General Tire & Rubber Company and essentially comprises an aqueous dispersion of the copolymer of a mixture of a conjugated diolefinic compound having up to seven carbon atoms, 2-vinyl pyridine and styrene, the 2-vinyl pyridine constituting from about 5 to 30 percent of the mixture, the styrene constituting from about 5 to 30 percent of the mixture, the 2-vinyl pyridine and styrene together constituting from about 10 to 35 percent of said mixture, and the diolefinic compound constituting the balance of the mixture.

It has been found that a vinyl pyridine latex containing about 17% resorcinol formaldehyde resin solution and about 83% pyridine latex provides an excellent rubber to fabric adhesive.

According to the present invention, a dry nylon fabric web may be passed through a dip tank containing "Gen-Tac" or other suitable adhesive in aqueous dispersion, heated in the oven while under tension to dry the web and heat the same and cooled before the tension is released so as to prevent shrinking. However, the dipping of dry nylon cords in the adhesive results in substantial absorption of the adhesive. The resulting cords leaving the oven tend to be relatively stiff even where "Gen-Tac" is used because of the adhesive that penetrates the cord.

It has been discovered that satisfactory adhesion of rubber to synthetic fiber cords can be obtained even when the adhesive occurs only near the surface of the cords and does not penetrate appreciably into the cords.

The present invention provides a method by which the penetration of the latex adhesive into the central portion of synthetic fiber cords is prevented. The cords, before being dipped in the aqueous latex adhesive dispersion are moistened with an aqueous liquid, such as water, which evaporates at temperatures below 300° F. without leaving any residue and which is compatible with and does not react with the latex adhesive. Such liquid upon evaporation may leave less than 0.5 percent residue. After dipping the excess liquid is removed by the use of scrapers, squeeze rolls, beater bars, air jets, or in any other suitable way, and the wet cords are then dipped in or otherwise treated with "Gen-Tac" or any other suitable rubber to fabric adhesive. Thereafer, the excess liquid and solid material is removed and the cords are heated and cooled usually while under some tension to dry the cords and to set the adhesive contained in the outer portion of each cord. The resulting cords are very flexible, are exceptionally well suited for tire carcasses, and adhere to rubber substantially as well as cords that are not predipped in water. Deterioration of the bond due to flexing is reduced since the coating of latex adhesive on the cords is relatively thin. The weight of solid material applied to the fabric is usually less than four percent of the dry weight fabric.

The present method of treating tire cords is particularly advantageous since it reduces the amount of relatively expensive latex adhesive needed to treat a given amount of fabric web. Where dry cords are dipped in "Gen-Tac" adhesive and dried, they may increase about 6 to 8% in weight due to the absorption of the adhesive. Where the cords are wetted with water before being dipped in the latex adhesive and dried, they may increase in weight about 2 to 4 percent due to the pick-up of adhesive. It has been found that a 2 percent pick-up of latex adhesive is usually sufficient to provide satisfactory adhesion of nylon cords to rubber in a tire carcass.

The present invention also contemplates the use of other fabric to rubber adhesives, for example of the type disclosed in the copending application of Samuel Salem, Serial No. 414,161, filed March 4, 1954, now U.S. Patent No. 2,766,164 and entitled "Adhesion of Synthetic Polymers to Polymerizable Materials." This copending application discloses direct adhesion of oriented synthetic linear polyamides and polyesters, such as nylon and Dacron, by the use of a cement containing an organic compound having a plurality of isocyanate groups. The cement may be prepared by first compounding the polymeric material such as pigment, curing agents, anti-oxidants, and the like and then dissolving the solid masticated polymer in a suitable non-aqueous solvent which is free of polar groups such as amine hydroxyl, carbonyl, etc. or groups capable of reacting with isocyanates. The solvent used is usually an anhydrous solvent such as toluene, benzene, xylene, or other suitable organic solvent which is difficult to handle in an oven due to its inflammability and tendency to explode when vaporized. However, solvent dips containing isocyanates are advantageous since they do not destroy the flexibility of the cord like heat-hardenable latex adhesives.

Such solvent dips may be employed in various ways and may be used in conjunction with neoprene or with various latex adhesives. If desired the synthetic fiber cord may be dipped in the solvent solution after previously having been dipped in an aqueous solution containing "Gen-Tac" or other latex adhesive and dried. However, it is preferable to utilize the solvent solution containing the isocyanates as the sole dipping solution in which case the neoprene or Gen-Tac would be dissolved in the solvent in the dip tank.

Figure 1:
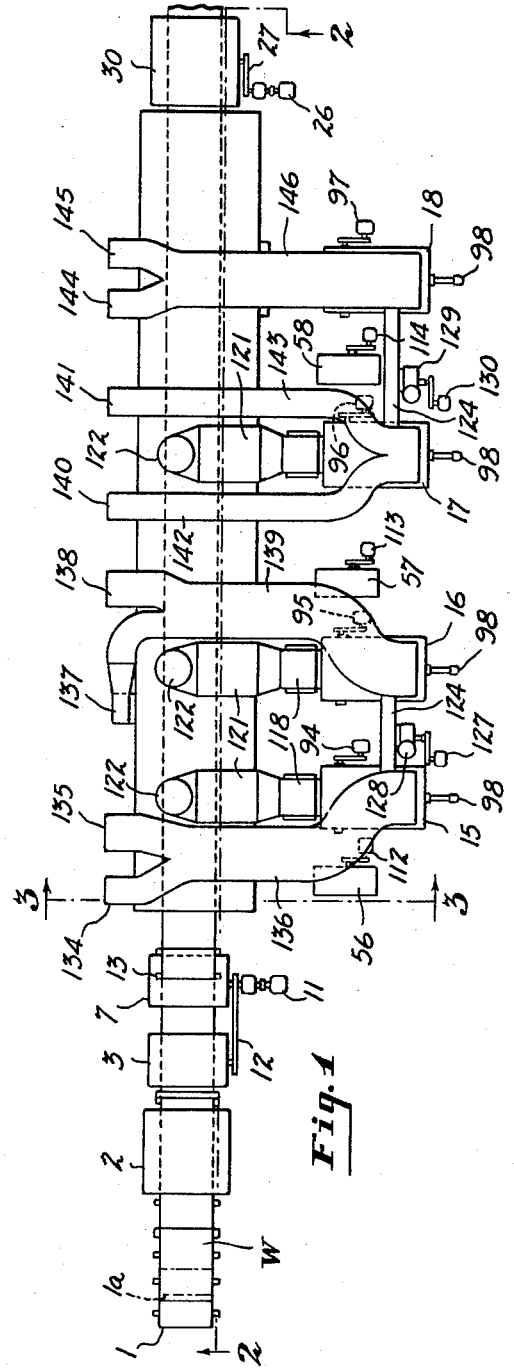
Figure 1 is a plan view of a nylon-rayon process oven constructed in accordance with the present invention.

As shown in Figs. 1 and 2, a fabric web W is fed from a supply roll 1 through a conventional festoon accumulator 2 to a dipping apparatus 3, spaced horizontal cylindrical rollers being provided to carry the web unwound from the supply roll. The dipping apparatus includes a first dip tank or trough 4 that is adapted to hold water or other vaporizable liquid that leaves no residue upon evaporation or any other suitable dipping solution, a submerged roller 5 in the tank 4, and a pair of parallel squeeze rolls 6 above the roll 5 for removing excess liquid from the web. The web leaving the accumulator 2 is guided by the rollers through the liquid contained in the dip tank 4 and between the rolls 6 to a second dipping apparatus 7. The web is then guided into a second dip tank or trough 8, similar to the tank 4, that contains "Gen-Tac" or other suitable latex adhesive in aqueous dispersion or other suitable adhesive. The apparatus 7 includes a submerged roller 9 which, like the roller 5, guides the web through the dipping solution in the dip tank and includes squeeze rolls or calendaring rolls 10 above the roller 9 that remove excess moisture and dip solids from the web. The squeeze rolls 6 and 10 are driven at the same peripheral speeds by suitable driving mechanism including a saturator motor 11 and a belt drive 12 whereby the fabric web W is unwound from the supply roll and rapidly pulled over the parallel rollers into the dip tanks. The web upon leaving the squeeze rolls 10 passes over a freely rotatable guide roller 13 located above the squeeze rolls and above the heating zones of the oven. The tension on the fabric web as it passes through the dip tanks may be only sufficient to prevent shrinkage and may be as low as ¼ to ½ pound per cord where 840/2 denier nylon cord is being treated. However, it is preferable to employ a higher tension during dipping which may be about 1 to 1½ pounds per cord where 840/2 denier nylon cord is treated or sufficient to stretch the cords about 1 or 2 percent.

Where rayon is being treated, the web from a supply roll 1a passes over the parallel guide rollers and through the festoon accumulator, the dip tanks, and the squeeze rolls to the upper guide roller 13. After passing over the roller 13, the rayon fabric web is guided by suitably located horizontal cylindrical rollers through an upper portion 14 of the nylon-rayon process oven where the web is heated by hot combustion gases directed to portion 14 from four combustion chambers or combustors 15, 16, 17 and 18. The rayon supply roll 1a and the rayon fabric web are shown in dotted lines in Fig. 2.

It will be understood that the roll ends may be spliced together to form a web of continuous length and that the splice will be able to withstand the tension applied to the web during stretching thereof.

Where nylon is being treated, the combustor 18 is manually or automatically shut off and hot gases from the combustors 15, 16 and 17 are directed to six heating zones or compartments located in a lower portion 19 of the nylon-rayon process oven, as indicated schematically in Fig. 6, each of said combustors supplying gases to two adjacent heating zones. The nylon fabric web from the supply roll 1 is guided through the accumulator, the dip tanks and the squeeze rolls by the parallel guide rollers and is directed over the upper roller 13 and under a lower cylindrical guide roller 20 at one end of the oven to the first nylon heating zone. The web W then passes through the six zones that are used for heating the nylon and seventh and eighth zones that are used for cooling the nylon to another horizontal cylindrical guide roller 21 located at the opposite end of the oven.

A partition 22 is located between the sixth and seventh zones, as shown in Fig. 2 to reduce the escape of heat from the heating to the cooling zones, a suitable slot being provided to permit passage of the web W through the partition. Similar slots are provided in the end walls of the oven to permit the entry and exit of the rayon or the nylon web without permitting substantial escape of heat from the oven.

After passing beneath and engaging the horizontal guide roller 21, the fabric web engages another horizontal cylindrical guide roller 23 at a higher elevation than the roller 21. The web is guided by the roller 23 to pull rolls which comprises three parallel cylindrical rollers arranged to drive the web and to apply a substantial tension thereto. These three rollers may be geared together and driven at the same peripheral speeds. However, as herein shown, the pull rolls comprise two idler rolls 24 having their axes in the same horizontal plane and a drive roll 25 in the bight of the idler rolls and below said plane. In order to prevent slippage of the web on the pull rolls 24—25 or the squeeze rolls 6 and 10, these rolls are preferably covered with rubber or the like. The roll 25 is driven at any desired speed by a suitable driving mechanism including a pull rolls motor 26 and a suitable belt drive 27.

As herein shown, the squeeze rolls 10 comprise two idler rolls 28 and a driving roll 29 therebetween that is operably connected to the saturator motor 11 to be driven thereby. These three squeeze rolls have vertically alined axes and squeeze the fabric web passing between adjacent rolls.

The pull rolls motor 26 is adapted to be operated at a speed with respect to the saturator motor 11 such that the peripheral speed of the pull rolls 24—25 is substantially greater than the peripheral speed of the squeeze rolls 10 whereby the fabric web is under tension and is stretched a substantial amount as it passes from the squeeze rolls through the oven to the pull rolls. In some cases the web may be subjected to a tension of more than 10,000 pounds and stretched up to about 20% as it passes from driving roll 29 to driving roll 25, but the tension does not exceed 10 pounds per cord where the oven is designed to treat nylon 840/2 denier cord.

The driving roll 29, like the roll 25, is preferably covered by a layer of rubber in the form of an annulus so as to prevent slippage of the web on the driving rolls when such a large tension is applied.

The end of the web is spliced to the web of new supply rolls so that an endless supply of fabric is available, such splices being able to withstand tensions well over 10,000 pounds.

Since the driving rolls 25 and 29 are each located in the bight of a pair of idler rolls, an increase in the tension on the web increases the friction between the web and the rubber surface of the driving rolls so that there is no substantial slippage even where the tension is well over 10,000 pounds. However, the nip pressure must be fairly high where the web is wet when it passes over the rolls.

The nylon fabric web leaving the pull rolls 24–25 is guided by horizontal cylindrical rollers through a conventional festoon accumulator 30 to a place of storage or to other rubber machinery (not shown) where the fabric is used to reinforce tire carcasses and similar rubber articles. Where rayon is being treated, the rayon fabric web is also guided by the roller 23 through the pull rolls and the accumulator 30 to a point of storage or use. The festoon accumulators 2 and 30 permit some variation in the rate of supply of the nylon or rayon fabric to and the rate of delivery of the fabric from the drying oven without requiring a change in the speed of the fabric through the web. However, means must be provided to slow down the motors 11 and 26 and the rate of fabric flow through the oven when the amount of fabric in accumulator 2 is reduced or the amount in accumulator 30 is increased beyond a predetermined amount or when the oven is shut down. It may also be desirable to increase the rate of flow of fabric when the reverse is true. The oven of the present invention is especially designed to permit changes in the rate of flow of fabric and to apply a predetermined tension to the fabric at a plurality of predetermined speeds.

Figure 7:
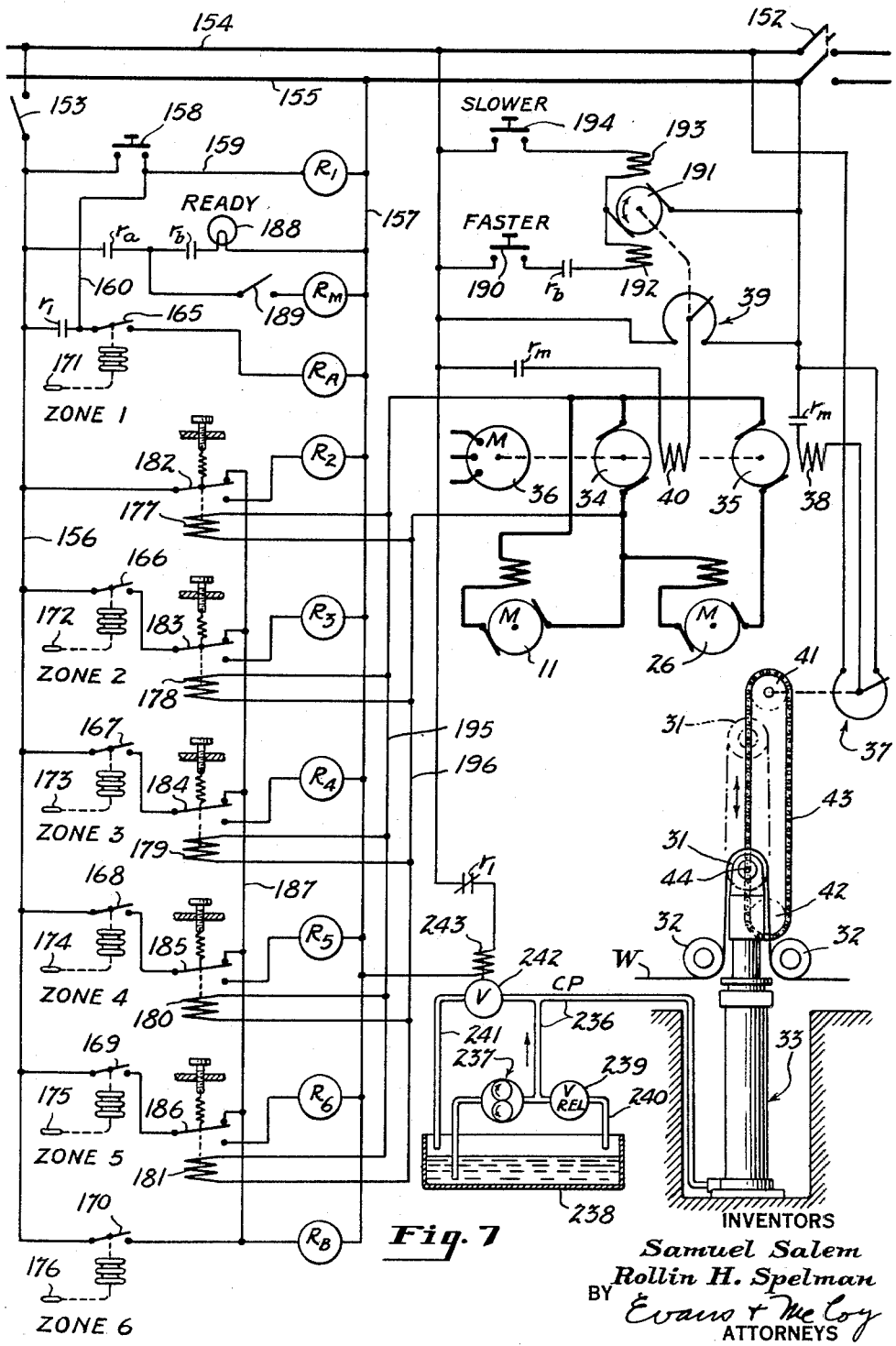
Fig. 7 is a diagrammatic view of the electrical control system used with the oven including a fragmentary elevational view of the mechanism used to apply tension to the nylon passing through the oven.

The tension in the fabric web may be controlled solely by regulating the speed of the pull rolls motor 26 with respect to the saturator motor 11 so that the pull rolls operate a predetermined percent faster than the squeeze rolls. However, it is preferable to apply a predetermined tension to the web W by means including a synchronizing dancer roll 31 and a pair of idler rolls 32, as shown in Figs. 2 and 7. Fluid motor means including a piston and cylinder unit 33 is provided for biasing the dancer roll 31 in an upward direction and for applying a predetermined force thereto.

Means is provided for supplying fluid at a predetermined constant pressure to the fluid piston carrying the dancer roll so that any desired force may be applied to the dancer roll and the fabric supported thereon. Since this force must be at least 20,000 pounds to apply a tension of 10,000 pounds to the fabric web, the unit 33 is preferably a high pressure hydraulic ram or the like. However, a compressed air method of tension application would also be satisfactory.

A predetermined tension may be applied to the web W by applying a predetermined force to the dancer roll 31, tending to move it upwardly, and by increasing or decreasing the speed of the pull rolls motor 26 with respect to the saturator motor 11 so that the fabric web applies an equal but opposite force, tending to move the dancer roll downwardly. A predetermined tension on the fabric web may therefore be maintained at any speed of the web by increasing the speed of the pull rolls motor with respect to the saturator motor when the dancer roll moves upwardly and vice versa.

Figure 7 shows schematically an electrical system which would be suitable to perform the above-described method. As illustrated therein, the direct current motors 11 and 26 are series wound and receive their power from a main direct current generator 34 and a booster generator 35. A three-phase alternating current motor 36 is operatively connected to the direct current generators 34 and 35 to drive them at constant speed whereby the output of each generator and the speeds of the motors 11 and 26 are directly proportional to the field excitations of the generators. The pull rolls motor 26 is placed in series with the main generator 34 and the booster generator 35 so that it will receive all the energy from the booster generator and will operate at a higher speed than the saturator motor 11, the speed of the motor 26 being greater than the speed of the motor 11 by an amount proportional to the field excitation of the booster generator. This excitation is controlled by the vertical movement of the dancer roll 31 through an adjustable rheostat 37 which controls the amount of current passing to the field windings 38 of the booster generator. A similar rheostat 39 controls the current passing to the field windings 40 of the main generator. However, the rheostat 37 is controlled automatically by the dancer roll to maintain tension on the web W while the rheostat 39 is controlled manually to determine the speed of the travel of the fabric web through the drying oven.

The rheostat 37 has a rotatable arm that is operatively connected to a pulley 41 for rotation therewith in unison. A similar pulley 42 is located directly below the pulley 41 and rotates on a fixed axis parallel to the fixed axis of the pulley 41. A belt or chain 43 is provided on the pulleys to drive the same and is connected to the dancer roll at 44 for movement therewith so that upward movement of the dancer roll rotates the pulley 41 and the rheostat in a direction to increase the field excitation of the booster generator and downward movement causes a decrease in said field excitation. The limits of movement of the dancer roll are shown in Fig. 7 and are located between the pulleys 41 and 42, the lowermost position of the roll being shown in solid lines in that figure and the uppermost position being shown in dotted lines. As shown in the drawings, the rotatable arm of the rheostat 37 moves clockwise and counterclockwise, respectively, when the pulley moves clockwise and counterclockwise.

Figure 7 shows diagrammatically a hydraulic system which might be employed to control the tension applied by the dancer roll 31. As shown, the hydraulic piston and cylinder unit 33 is connected by a supply conduit 236 to the outlet side of a gear pump 237. The pump delivers hydraulic fluid from a reservoir 238 to the unit 33 at a constant pressure which is preselected by an adjustable regulating valve or relief valve 239 located in a bypass conduit 240 which returns fluid from the supply conduit to the reservoir. The relief valve may be set to provide any predetermined constant pressure in the supply conduit 236 up to the maximum for which the pump was designed whereby the tension on the fabric web may be varied over a wide range.

If any of the cords of the fabric web W should break during the application of high tension to the web, the tension on the web should be rapidly reduced to avoid breaking other cords. This reduction in tension may be accomplished in various ways but is preferably effected by stopping the movement of the web and automatically removing hydraulic pressure from the unit 33. A suitable bypass valve may be provided to reduce the pressure in the supply conduit automatically in response to stopping of the web. As herein shown, the supply conduit 236 is connected to the reservoir 238 by a bypass conduit 241 so that all the fluid from the pump 237 flows through the bypass conduit when the oven is shut down. A solenoid-operated bypass valve 242 is provided in the conduit 241 to control the flow therethrough. The bypass valve is normally biased to fully closed position so as to prevent any flow through the bypass conduit but is opened automatically in response to energization of a solenoid 243.

During the hot-stretching process it is preferable to closely control the tension on the cords, the temperature of the cords, the elongation of the cords, and the length of time that they are heated, and where the cords are heated with hot gases at high velocity it is desirable to control the temperature and velocity of the gases and the length of time the gases heat the cords. Since any desired constant pressure may be applied to the piston of the hydraulic unit 33, it is possible to apply any desired tension to the synthetic fiber cords being treated up to the maximum for which the tensioning apparatus was designed even when the cords are passed through the drying oven at high velocity.

A polyhexamethylene adipamide fabric web having several thousand strong 840/2 denier cords may be treated according to one method of the present invention by dipping the web in "Gen-Tac" adhesive, drying and heating the web with hot gases at a predetermined temperature of about 375° to 425° F. for a predetermined time of about 18 to 20 seconds while subjecting the web to a tension sufficient to obtain a stretch preferably of about 14 to 18 percent which for this particular cord is about 5 to 5.5 pounds per cord, and rapidly cooling the cords with air at substantially atmospheric temperature to reduce their temperature below about 150° F. before the tension is released to prevent excessive shrinking of the cords. Cord material prepared in this way has been found to be excellent for building passenger and truck tires and other reinforced rubber products. Such a hot-stretching process stabilizes the nylon cord so as to reduce tire growth due to elongation and stretching of the cord and greatly increases the life of the tires.

The nylon-rayon oven shown in Figs. 1 to 6 of the drawings is adapted to treat nylon, rayon, Dacron, Perlon, or similar synthetic fiber cords. When a rayon fabric web is treated, it is guided by parallel cylindrical rollers through the upper portion 14 of the oven where it passes over a plurality of large drums 45 in the front part of the oven and two parallel rows of guide rollers 46. During this rayon treatment, the upper portion of the oven is heated to the desired temperature by the combustors 15, 16, 17 and 18. Whenever it is necessary to slow down or stop the travel of the rayon web or to discontinue treatment thereof, the upper portion 14 may be rapidly purged of hot gases by shutting off the supply of fuel to the combustors and by blowing air at atmospheric temperature through the upper portion of the oven.

However, the present invention is primarily concerned with the nylon treating portion of the oven. As shown herein, the lower portion 19 of the nylon-rayon process oven has six heating zones adapted to receive hot gases from the combustors 15, 16 and 17 and two cooling zones adapted to receive air at atmospheric temperature passing through the combustor 18 when the fuel supply thereto is shut off. As shown, each of the eight heating and cooling zones has a relatively small volume and is provided with five nozzles 47 that direct gases at a predetermined high velocity downwardly onto the fabric web W travelling through the lower portion 19 of the oven and normal to the web. However, the nozzles may be provided both above and below the web if desired to obtain more uniform heat transfer.

Each of the nozzles 47 is constructed in the same way and comprises an upstream portion 48 of uniform rectangular cross section and a downstream portion 49 of similar transverse cross sectional form that tapers in the downstream direction. Each nozzle has a longitudinal slot 50 of uniform width in the bottom wall thereof directly above the fabric web W and of substantially the same length as the width of the web. A continuous downwardly projecting flange 51 extends around the margin of each slot 50 to direct gases from the nozzle at high velocity directly onto the fabric web W as shown in Fig. 3 whereby the web is heated or cooled rapidly to a temperature approaching that of the gases flowing through the slots 50. As herein shown, the internal cross-sectional area of each nozzle 47 in the portion 49 thereof is reduced in proportion to its distance from the portion 48 whereby there is no substantial pressure drop as the gases flow through the nozzle and the velocity of the gases through the slot 50 is substantially uniform throughout its length. This is illustrated in Fig. 4, the outline of the upstream portion 48 being illustrated in dotted lines in that figure.

Suitable means are provided to supply hot gases or cooling air at high velocity to the nozzles 47 so that each of the small volume zones may quickly be heated or may quickly be purged of hot gases and cooled. The supplying of cooling air to the nozzles handling the hot gases eliminates the necessity of separate nozzles for the cooling air.

As herein shown, gases are supplied to each of the nozzles 47 in the six heating zones by a conduit 52 and to each of the nozzles 47 in the two cooling zones by a cooling air conduit 53. The inlets to the ten cooling air conduits are always open and in communication with a main conduit 54 through branch conduits 55. However, the inlet to each of the conduits 52 is controlled by a three-way air valve or flap valve so that the nozzles in each heating zone may be selectively connected either to one of the combustors 15, 16 and 17 or to one of three cooling air fans or blowers 56, 57 and 58.

The flow of gases from the blower 56 and the combustor 15 to all the nozzles 47 of the first and second heating zones, respectively, is controlled by flap valves 59 and 60; from the blower 57 and the combustor 16 to the third and fourth heating zones, respectively, by flap valves 61 and 62; and from the blower 58 and the combustor 17 to the fifth and sixth heating zones, respectively, by flap valves 63 and 64, as best shown in Fig. 6. The five-flap valves for each heating zone are preferably actuated in unison to their uppermost and lowermost positions by solenoid-controlled double-acting reciprocating fluid motor means. As herein shown, the positions of the three-way valves 59 to 64 are controlled by air cylinders 65 and 70, respectively.

Each of these air cylinders is constructed like the cylinder 65 shown in Figs. 3 and 5, and comprises a conventional piston and cylinder air motor, a pilot valve at one end thereof determining the end of the piston to which high pressure air is supplied and the direction of movement of the piston, and a pair of solenoids for controlling the position of the pilot valve, as is well understood in the art. One solenoid is de-energized when the other is energized, whereby the pilot valve is held in either of two extreme positions depending upon which of the solenoids is actuated. As herein shown, the air cylinders 65 to 70 are provided with solenoid-operated pilot valves 71 to 76, respectively, for electrically controlling the positions of the flaps valves 59 to 64.

Similar air cylinders 77, 78 and 79 provided with solenoid-operated pilot valves 80, 81 and 82, respectively, are used for electrically controlling the positions of normally-open bypass valves or dampers 83, 84 and 85, respectively, as will be hereinafter described.

The flap valves 59 to 64 normally block the flow of hot gases to the nozzles 47 from the three combustors and establish communication between the discharge of the cooling air blowers and the nozzles so that all zones are cooled with air when the use of the oven is discontinued and until the blowers are stopped. Communication between each of the cooling air blowers 56, 57 and 58 and the conduits 52 is established by suitable conduit means including a main air supply conduit 86 and four branch air conduits 87. When the lower portion 19 of the oven is heated, the flap valves may be moved to a position in which communication between conduits 87 and 52 is cut off and communication is established between each of the combustors 15, 16 and 17 and the conduits 52 of the heating zones. The latter communication is established by suitable conduit means, including a main gas supply conduit 88 and four branch conduits 89.

It is preferable to employ a semi-closed heating system for supplying hot gases to the heating zones. As shown herein, the combustors 15, 16, 17 and 18 are located in semi-closed circuits each including a hot-gas fan or blower for circulating hot gases at high velocity, exhaust means including an exhaust fan for removing a small portion of the combustion gases from the circuit, and air intake means for replacing the gases removed by the exhaust fan and for supplying fresh air to the combustor.

The four semi-closed circuits employed to heat the nylon-rayon oven are shown schematically in Fig. 6 wherein the supply of gases flowing from the combustors or combustion chambers is indicated by heavy lines, the recirculation of the gases is indicated by light lines, and the flow of air from atmosphere or through the cooling air fans is indicated by heavy dotted lines.

The combustors 15, 16, 17 and 18 are provided with suitable fans or blowers 90, 91, 92 and 93, respectively, which are driven at constant speed through suitable belting by motors 94, 95, 96 and 97, respectively, and which are adapted to withstand the high temperatures produced in the combustion chambers.

Each of the combustors is also provided with a main fuel supply conduit 98, a fuel supply nozzle or main burner 99 connected thereto, a pilot burner 100 that is continuously supplied with fuel, preferably through a pilot conduit 101 to ignite the fuel from the fuel nozzle, means to ignite the pilot burner, and valve means including a thermostatically-controlled valve 102 to control the supply of fuel through the supply conduit 98.

As herein shown, each of the fuel valves 102 is solenoid-operated and is connected by suitable wring to a thermosensitive element located in one of the heating zones, preferably in a supply conduit 52 as best shown in Fig. 3, whereby the fuel is controlled in accordance with the gas temperature and a predetermined constant gas temperature is maintained. The fuel valves for the combustors 15, 16 and 17 are connected to thermostatic elements 103, 104 and 105, respectively, which measure the temperature of the hot gases entering the first, third and fifth heating zones, respectively, so as to maintain this temperature constant. Since the gas temperature in the ducts leading to the second, fourth and sixth heating zones is substantially the same as that leading to the first, third and fifth heating zones, respectively, the combustors 15, 16 and 17 are adapted to supply hot gases at a predetermined constant temperature to each of the six heating zones as determined by the fuel valves 102.

Means are also provided to turn on or shut off the supply of fuel to the nozzles 99. As herein shown, the fuel supply conduits leading to the combustors 15, 16 and 17 are provided with normally-closed solenoid-operated shut-off valves 106, 107 and 108, which are provided, respectively, with solenoids 109, 110 and 111 as best shown in Fig. 8.

The cooling air fans 56, 57 and 58 are normally driven through suitable belt drives by three-phase electric motors 112, 113 and 114, respectively, but when fuel is supplied to the combustors to heat all of the six heating zones, these motors are automatically stopped. When the fuel valves 106, 107 and 108 are returned to their normal shut-off position, the fan motors automatically start, whereby the cooling fans 56, 57 and 58 receive air at atmospheric temperature through their respective inlets 115, 116 and 117, and discharge the same at high velocity and high pressure through the nozzles 47 so as rapidly to purge the small volume heating zones of hot gases.

The drying oven shown in the drawings is provided with a semi-closed heating circuit for heating two zones, four of such circuits being used in the oven illustrated herein for the eight heating and cooling zones. Each of these circuits is substantially the same as that shown in Fig. 3 and includes a gas chamber 118 that is adapted to supply hot gases to the nylon-heating portion of the oven through the main supply conduit 88 or, in the alternative, to supply these hot gases to the rayon-heating portion 14 of the oven through a plurality of conduits 119. The flow of gases to the nylon or rayon heating portions of the oven is selectively controlled by a three-way or flap valve 120 which is moved to the position shown in Fig. 3 to cut off all flow to conduits 119 when nylon is being treated.

Connected to each chamber 118 is a bypass conduit 121 which discharges half of the gases leaving the combustor through an exhaust stack 122 when the bypass valves or dampers are opened, and discharges all of the gases through the conduit 88 to the nozzles 47 when the bypass dampers are closed. Suitable recirculating ducts are provided to return the gases from the heating zones to an inlet 123 of the combustor so that they may be reheated and returned to the nozzles 47.

Connected to the recirculating ducts upstream of the inlets 123 are exhaust ducts 124 through which a portion of the gases is continuously removed from the circuit. An air inlet 125 is provided adjacent the inlet 123 to replace the portion removed with fresh air and to supply the oxygen necessary to support continuous combustion in the combustor. The exhaust ducts from the semi-closed circuits containing combustors 15 and 16 are connected to an exhaust fan 126 which is continuously driven at constant speed by a motor 127 through a suitable belt drive as best shown in Fig. 5. The fan 126 continuously removes about 10% of the gases in the semi-closed circuit and discharges the same to an exhaust stack 128. The semi-closed circuits containing the combustors 17 and 18 are likewise provided with an exhaust fan 129 that is continuously driven by a motor 130 to discharge gases through an exhaust stack 131.

Each of the recirculating ducts is adapted to return gases from the nylon or the rayon heating portions of the drying oven and contains suitable valves to cut off the flow of gases from either of these portions when that portion is not in use. Suitable dampers 132 are provided in the recirculating ducts to cut off the flow of gases from the rayon heating portion 14 of the oven when it is not in use, and similar dampers 133 are provided to cut off the flow from the nylon heating portion 19. When nylon is being treated, the dampers 132 are closed and the dampers 133 are open as shown in Fig. 3.

The semi-closed circuit for supplying hot gases to the first two heating zones includes a pair of vertically extending recirculating ducts 134 and 135 which lead from the lower portion 19 of the oven to a horizontal recirculating duct 136 that returns gases to the inlet 123 of the combustor 15. Similar vertically extending ducts 137 and 138 conduct gases to a horizontal recirculating duct 139 in the circuit for the third and fourth heating zones. The circuit for the fifth and sixth heating zones is provided with vertically extending recirculating ducts 140 and 141 which conduct gases from the heating zones to a pair of parallel horizontal recirculating ducts 142 and 143, respectively, located on opposite sides of the stack 122 and the combustor 17, as shown in Fig. 1.

The recirculating ducts for the sixth and seventh cooling zones have fewer bends than those for the six heating zones since they need not detour any bypass conduits or exhaust stacks. As shown herein, the gases from these zones are conducted through vertical recirculating ducts 144 and 145 to a horizontal recirculating duct 146 and through the latter duct to the inlet 123 of the combustor.

The seventh and eighth zones may be heated by supplying fuel to the combustor 18, but it is preferable to cool these zones with the air passing from the blower 93 when nylon is being treated and to supply fuel to the combustor 18 only when rayon is being treated. It will therefore be understood that the fuel supply to combustor 18 is cut off manually or automatically so that cool air is supplied to the nozzles 47 by the fan 93 when nylon is being treated.

The six heating zones could be cooled similarly with the fans 90, 91 and 92 by cutting off the fuel supply to the combustors 15, 16 and 17, but it is preferable to stop operation of these fans when the fuel supply is discontinued and to cool the zones with separate blowers 56, 57 and 58 whereby the zones may be rapidly purged of hot gases with cooling air.

The present invention is particularly advantageous since it permits varying or stopping the flow of the fabric web at any time without damaging the fabric. If at any time, it should be necessary to stop production, the saturator motor 11 and the pull rolls motor 26 may be slowed down and stopped and tension on the web may be reduced. Since the blowers 56, 57 and 58 may purge the small volume heating zones of hot gases and cool the same substantially in a period of about 5 seconds, there is little danger of overheating the fabric web by stopping the flow thereof. Likewise the small volume of the heating zones and the high velocity of the hot gases permit heating of the zones in the shortest period of time.

The electrical apparatus for carrying out the method of the present invention is shown schematically in Figs. 7 and 8. When nylon or similar material is to be treated, the valves or dampers 120 and 132 are adjusted to prevent flow of gases to and from the rayon-heating portion of the oven, the fuel supply to the combustor 18 is cut off, and a three-pole switch 147 is closed to supply current to the generator motor 36 and to the fan motors 112, 113 and 114. At this time the fans 90 to 93 and the exhaust fans 126 and 129 will be operating, but the fabric web W suspended in the lower portion 19 of the oven will be stationary. Suitable means, such as starters 148 to 151, are provided for the motors 36, 112, 113 and 114, respectively, to prevent overloading during starting.

When all the fan motors and generator motors are operating, switches 152 and 153 are closed to supply current to the electrical circuit shown in Fig. 7. At this time, the rheostats 37 and 39 are set to a position wherein the field excitation in generators 34 and 35 is insufficient to cause movement of the fabric web W by the motors 11 and 26. However, to insure that the field windings 38 and 40 are not energized at an improper time, a normally-open switch $r_m$ may be provided in the line leading to each field winding.

As seen in Fig. 7, there are two main supply lines 154 and 155 controlled by the two-pole switch 152. Connected to these lines are branch lines 156 and 157 which are adapted to supply current to a plurality of relays arranged in parallel. In order to initiate the supply of hot gases to the first heating zone, a quick-cooling-reset push button 158 is depressed to close a line 159 connecting branch lines 156 and 157 and containing a relay $R_1$. This relay is thereby energized to close a normally-open switch $r_1$ which is connected in series with the relay $R_1$ by means of a line 160 so as to form a holding circuit. The relay $R_1$ therefore remains energized after push button 158 is released so that the first zone is heated at all times or until switch 152 or 153 is opened.

When relay $R_1$ is energized, the normally-closed fuel valve 106 is opened to place the combustor 15 in operation and the flap valve 59 is moved from its uppermost or normal position preventing flow from the combustor 15 to the conduit 52 to its lowermost position preventing flow from the fan 56 to the conduit 52.

One type of electrical system which could be used to accomplish such a result is shown schematically in Fig. 8, it being understood that the simplified system shown in that figure is intended for illustration only and does not represent a complete practical electrical circuit as would actually be employed in an oven of the type shown in Figs. 1 to 5. It will be obvious, for example, that further electrical controls will be needed for best operation of the rayon portion 14 of the oven which is not described in great detail herein.

As shown in Fig. 8, the solenoids for the pilot valves 71 to 76 are connected in parallel and to the main supply lines by branch line 161 and 162, and the solenoids for the fuel valves 106, 107 and 108 and for the pilot valves 80, 81 and 82 are connected in parallel and to the main supply lines by branch lines 163 and 164 whereby the relays shown in Fig. 7 control the flap valves, the bypass valves, and the fuel valves. The lower solenoid shown for each of the pilot valves 71 to 76 and 81 to 83 is normally energized since it is connected in series with a normally-closed relay-operated switch and the upper solenoid is normally de-energized since it is connected to a normally-open switch.

Before the relay $R_1$ is energized, the normally-closed switches convey current to the motors driving blowers 56, 57 and 58 and to the lower solenoids for the air cylinders 65 to 70 whereby the flap valves 59 to 64 are moved to their upper positions and cooling air is supplied from the blowers 56, 57 and 58 to the six heating zones. At this time the lower solenoids for the air cylinders 77, 78 and 79 are also energized so that the bypass valves 83, 84 and 85 are fully open.

When the relay $R_1$ is energized by means of the push button 158, the normally closed switch $r_1$ is opened to de-energize the lower solenoid for pilot valve 71 and the normally-open switch $r_1$ is closed to energize the upper solenoid whereby air cylinder 65 moves flap valve 59 to its lowermost position to cut off the flow of cooling air from the blower 56 to the nozzles 47 of the first heating zone. At the same time the relay $R_1$ closes another normally-open switch $r_1$ to energize the solenoid 109 and to open valve 106 so as to initiate operation of the combustor 15. The relay $R_1$ therefore effects heating of the first zone.

As herein shown, the relay $R_1$ also controls the normally-closed bypass valve 242 so that tension on the web W is automatically removed when the web is stopped and the oven is shut down. When operation of the oven is initiated by means of the push button 158, the relay $R_1$ is energized and a normally-closed switch $r_1$ in series with the solenoid 243 is opened to de-energize said solenoid. As long as the oven remains in operation, the relay $R_1$ is energized and the bypass valve 242 remains closed so that high tension may be applied to the web by the dancer roll 31. If operation of the oven is discontinued and the relay $R_1$ is de-energized, the switch $r_1$ closes to energize the solenoid 243 and to open the bypass valve 242 whereby high tension is removed from the web.

A thermostatically controlled switch is provided to indicate the heating of each of the six zones beyond a predetermined temperature which is adjustable over a wide range. Heating zones one to six are provided with normally-open thermostatically controlled switches 165 to 170, respectively, which are closed when the zones reach a predetermined temperature. These switches are actuated by bellows or other suitable means controlled by thermosensitive elements 171 to 176, respectively, which are located to measure the temperature of the hot-gases in the heating zones. The thermosensitive element for each zone is preferably located in one of the conduits 52 leading to that zone, as shown in Fig. 3, the temperature at that location being indicative of the actual temperature in the heating zone adjacent the web W because of the high velocity of the gases.

After heating of zone 1 has been initiated by the relay $R_1$ and the gases entering the heating zone have a temperature above a predetermined minimum value, the thermosensitive element 171 will cause closing of the switch 165 so as to supply current to a control relay $R_A$ to energize the same. Since the first zone remains heated at all times unless the flow of fabric web is discontinued and the relay $R_1$ is de-energized as by opening switch 153, the relay $R_A$ will normally be energized at all times.

A main control relay $R_B$ is also provided in the electrical circuit, the flow of current thereto being controlled by the switches 166 to 170 and five adjustable voltage sensitive meter relays 177 to 181. Said relays are responsive to the speed of the fabric web flowing through the heating zones and prevent increase in the speed of the web beyond a predetermined value before the heating zones reach the preselected minimum temperature required to close the switches 166 to 170. The coils of the relays 177 to 181 operate switches 182 to 186, respectively, and when subjected to a voltage above a predetermined amount, move them from their normal uppermost positions, shown in Fig. 7, to their lowermost positions. In the uppermost position of each switch, it engages a contact which is connected to the main control relay $R_B$ through a line 187. In the lowermost position of each switch, it engages another contact that is connected to one of five relays $R_2$ to $R_6$, which control heating and cooling of the heating zones.

As shown in Fig. 7, the switch 182 normally is in its uppermost position and energizes the main control relay $R_B$ through line 187. Therefore, the main relay $R_B$ is energized at the time heating of the first zone in initiated and when the relay $R_A$ is first energized.

An electric light 188 is provided to indicate when the main relay is energized and when the speed of the fabric web may be increased. This "ready" light is located between lines 156 and 157 and is in series with two normally-open switches $r_a$ and $r_b$, which are closed when the relays $R_A$ and $R_B$ are energized.

As soon as the first zone is heated sufficiently to close the switch 165, the relay $R_A$ is energized and the ready light 188 is illuminated. At this time a switch 189 is closed and the normally-open switch $r_a$ is closed to energize the relay $R_M$ and to close the normally-open switches $r_m$ which control the supply of current to the generator fields 38 and 40.

Since the fabric web W is stationary during the initial heating of the first zone, it is necessary to start the motors 11 and 26 soon after this zone is heated to prevent overheating of the web. Therefore, the field windings of the generators 34 and 35 should be energized to start the movement of the web very soon after the relay $R_A$ is energized. Since the high velocity gases heat the first zone in a very short period of time, the movement of the web may be initiated before the web is heated for an undue length of time.

As soon at the ready light 188 indicates the closing of switch 165 and the energizing of relays $R_A$ and $R_B$, a push button 190 is depressed to increase the field excitation of the main generator 34 and to start motors 11 and 26. The supply of current to the field windings 40 of this generator is controlled by the rheostat 39 which has a rotatable arm operatively connected to the rotor of a reversible electric rheostat motor 191 for rotation therewith.

The rheostat motor has two field windings for turning the rotor in opposite directions. A fast field 192 operates the motor 191 in a direction to increase current supplied to the main generator field 40 so as to increase the speed of the motors 11 and 26 and a slow field 193 operates the motor in the opposite direction.

The rheostat 39 may be gradually rotated at any time by the motor 191 in a direction to decrease the current supplied to the field 40 by depressing a push button 194 so as to supply current to the slow field 193. Therefore, the flow of the fabric web through the drying oven may be decreased or stopped at any time.

However, the rheostat 39 may not be rotated in the opposite direction by depressing the push button 190 to speed up the flow of the web unless the main control relay $R_B$ is energized. A normally-open switch $r_b$ is provided between the button 190 and the fast field 192 to prevent speeding up of the motors 11 and 26 when the main relay $R_B$ is de-energized, the switch $r_b$ being closed by the relay $R_B$. Therefore, the operator waits until the ready light 188 is illuminated before depressing the push button 190 to speed up the fabric web. This insures adequate heating of the web at all times.

It will be apparent that the speed of the saturator motor 11 and the rate of flow of the fabric web through the oven will be directly proportional to the current passing through the main generator field 40 and the voltage increase across the generator 34. Lines 195 and 196 are connected to the input and output sides of the main generator 34 and to the coils of the meter relays 177 to 181 so as to measure the voltage across the generator and the speed of the fabric web through the oven.

Each of the five voltage-sensitive meter relays is provided with suitable adjusting means so that the switch thereof may be actuated in response to any predetermined voltage. In order to perform the method of the present invention, the relays are adjusted so that more voltage is required to actuate the meter relay for each heating zone than that required to actuate the meter relay for the zone upstream thereof and so that the speed of the fabric web is maintained nearly proportional to the number or length of the zones being heated.

When the first zone is heated and the ready light 188 indicates that the flow of the fabric web can be initiated, the push button 190 is held in a depressed position and the motor 191 gradually rotates the arm of the rheostat 39 to increase the field excitation and the voltage output of the main generator 34. When this voltage and the speed of the motor 11 reach a predetermined value, the light 188 will be extinguished and the switch 182 will be pulled downwardly by the coil of the relay 177 to de-energized the main control relay $R_B$ and to energize the relay $R_2$ for the second zone. As such a predetermined speed of the motor 11 the normally open switch $r_b$ will open and cut off the flow of current through the fast field 192 whereby the gradual adjustment of rheostat 39 will cease and the motor 11 will continue to operate at the same speed.

Upon energization of the relay $R_2$ by the switch 182, the normally closed switches $r_2$ of Fig. 8 are opened to de-energize the lower solenoids of the pilot valves 72 and 80 and the normally open switches $r_2$ are closed to energize the upper solenoids of said pilot valves whereby the air cylinder 77 closes the normally open bypass valve 83 and the air cylinder 66 moves the flap valve 60 to its lower position to cut off the flow of cooling air to the second heating zone from the blower 56.

Since all the flow of cooling air to the first and second heating zones is cut off upon energization of the relay $R_2$, it is preferable to shut off the fan 56 at this time. As herein shown, the starter 149 is provided with three normally closed switches $r_2$ which are opened by the relay $R_2$ to shut off the fan motor 112 when the first and second zones are being heated. These switches are closed to restart the fan motor when the relay $R_2$ is deenergized. The starters 150 and 151 are similarly provided with normally closed switches $r_4$ and $r_6$ which are opened by the relays $R_4$ and $R_6$, respectively, to stop the fan motors 113 and 114.

As soon as the second heating zone reaches a predetermined minimum temperature, the element 172 will cause closing of the switch 166 whereby current will flow through the switch 183 and the relay $R_B$ to energize the latter. At this time the light 188 will go on to indicate that the first and second zones are heated and that the switch $r_b$ between push button 190 and the fast field 192 is closed. The push button 190 is then held in depressed position to gradually adjust the rheostat 39 and further increase the speed of the saturator motor 11. After a predetermined increase in speed the voltage applied to the coil of meter relay 178 will exceed a predetermined value and will actuate the switch 183 to energize the relay $R_3$ and to de-energize the main control relay $R_B$ whereby the light 188 goes out, the rheostat motor 191 stops, and heating of the third zone is initiated.

The relay $R_3$ when energized effects heating of the third zone like the relay $R_1$ effects heating of the first zone. When the switch 183 energizes the relay $r_3$, the normally-open and normally closed switches $R_3$ are closed and opened, respectively, to open the fuel valve 107 for the combustor 16 and to move the flap valve 61 to its lowermost position to cut off the flow of cooling air from the blower 57.

The operation of the electrical controls for the remaining heating zones is similar to that for the first two zones. When the third zone is heated beyond a predetermined temperature, the switch 167 is automatically closed to energize the main control relay $R_B$. The ready light 188 is again illuminated and the push button 190 is depressed to effect gradually a further adjustment in the rheostat 39 and a further increase in the speed of the motor 11. After a further predetermined increase in the voltage across the main generator, the coil 179 actuates the switch 184 to energize the relay $R_4$ and de-energize the main control relay $R_B$. Again the rheostat motor 191 stops its movement so that the motor 11 operates at a constant speed. It will be understood that the adjustment of the rheostat 39 is not disturbed between actuations of the rheostat motor so that the fabric web moves at a substantially constant speed after each de-energization of the field windings 192 and 193.

When the relay $R_4$ is energized it effects heating of the fourth heating zone like the relay $R_2$ effects heating of the second zone by closing the normally open switches $r_4$ and opening the normally closed switches $r_4$ whereby the fan motor 113 is stopped, the bypass valve 84 is closed by the air cylinder 78, and the flap valve 62 is moved to its lowermost position by the air cylinder 68.

When the fourth zone is heated beyond a predetermined minimum temperature and the ready light 188 is turned on due to closing of the switch 168 and energization of the main control relay $R_B$, the speed of the fabric web may again be increased a predetermined amount by energizing the fast field 192 of the rheostat motor. After a predetermined increase in voltage due to the resulting adjustment of the rheostat 39, the coil of the meter relay 180 will actuate the valve 185 to its lower position whereby the relay $R_5$ is energized, the main relay $R_B$ is deenergized, and the rheostat motor 191 again stops.

Energization of the relay $R_5$ then causes actuation of the solenoid-operated pilot valve 75 and the normally-closed fuel valve 108 to initiate operation of the combustor 17 and to cut off the flow of air from the fan 58 past the flap valve 63 to the nozzle 47 of the fifth heating zone.

When this zone is heated above a predetermined minimum temperature to close the normally open switch 169 and to energize the main control relay $R_B$, the fast field 192 of the motor 191 may again be energized to effect a further predetermined increase in the speed of the fabric web. In response to such a predetermined increase, the voltage sensitive relay 181 will energize the relay $R_6$ to initiate heating of the sixth zone and the main control relay will be de-energized to stop rotation of the rheostat motor 191.

Upon energization the relay $R_6$ will operate the normally-open and normally-closed switches $r_6$ shown in Fig. 8 to stop the fan motor 114, to close the bypass valve controlled by the solenoid-operated pilot valve 82 and to cut off the flow of cooling air to the sixth heating zone from the blower 58 past the flap valve 64.

The normally-open switch 170 will close when the thermosensitive element 176 is heated beyond a predetermined minimum temperature and will energize the main control relay $R_B$ to permit further energization of the fast field 192 and a further increase in the speed of the fabric web. The rheostat 39 has a maximum speed position which is adjustable over a wide range and which limits the speed of the web through the oven. The rheostat 39 for the oven shown in Figs. 1 to 6 is preferably set for a maximum fabric web speed of about 180 feet per minute. Therefore, when the sixth zone is heated to the desired temperature, the fast push button 190 cannot increase the speed of the web W beyond 180 feet per minute unless the maximum speed setting of the rheostat 39 is adjusted.

The above description illustrates how the oven is normally started into operation and adjusted for maximum production. However, it will be understood that the slow push button 194 may be depressed at any time to slow down the fabric web and to reduce the number of zones being heated. The operation of the relays during slowing down will be obvious to those skilled in the art. When the speed of the motors 11 and the voltage across the main generator drops below the predetermined minimum value required to hold the switches 182 to 186 in their lowermost position, these switches return automatically to their normal uppermost positions and de-energize successively the relays $R_2$ to $R_6$.

Assuming that all six heating zones have been heated to the temperature set by the thermosensitive elements 103, 104 and 105 and that all the switches 165 to 170 are closed, the speed of the fabric web may easily be decreased by depressing the push button 194, so as to gradually adjust the rheostat in a direction to decrease the power output of the main generator 34 and the speed of the motors 11 and 26. As long as the button is depressed the speed of the fabric web through the oven continues to decrease. Where the slow push button is held down until the relays $R_2$ to $R_6$ are de-energized, it may be possible to cool the five heating zones in a period of less than about five seconds.

There is no danger of overheating due to slowing down the flow of the fabric web since the relays $R_2$ to $R_6$ are successively de-energized rapidly to cool the heating zones. Thus, when the rheostat 39 is adjusted so that the voltage output of the main generator 34 falls below that required to hold the switch 186 in its lower position, the relay $R_6$ will be de-energized causing operation of the air cylinders controlled by pilot valves 76 and 82 and opening of the bypass dampers 85 and the flap valve 64. At the same time the normally-closed switch $r_6$ will close to effect operation of the fan motor 114 by the starter 151 whereby the fan 58 will rapidly purge the sixth heating zone of hot gases with air at approximately atmospheric temperature. It will be apparent that subsequent de-energization of the relays $R_2$ and $R_4$ similarly effects rapid purging and cooling of the second and fourth heating zones.

When the voltage output of the main generator is adjusted by the rheostat 39 so that it is insufficient to hold the switch 185 in its lowermost position, the switch will de-energize the relay $R_5$. The normally open switches $r_5$ shown in Fig. 8 will then return to open position and cause closing of the fuel valve 108 and operation of the solenoid-operated pilot valve 75 whereby the combustor 17 will cease to operate and the flap valve 63 will be returned to its uppermost position to permit cooling air from the fan 58 to purge the fifth heating zone of hot gases and rapidly cool the same. It will be understood that subsequent de-energization of the relays $R_1$ and $R_3$ will purge and cool the first and third zones, respectively, in the same way.

As herein shown the push buttons 190 and 194 are employed in the control system to speed up or slow down the fabric web semi-automatically. However, each of these push buttons may be held down continuously or may be replaced by a hand switch that remains in closed position until opened whereby speeding up and slowing down of the web is fully automatic in which case the ready light 188 could be omitted. For example, the number of zones being heated and the speed of the fabric web is automatically increased by holding the fast push button 199 continuously in closed position. In such a case the speed of the motor 11 would be increased automatically in response to heating of the sixth zone and closing of the switch 170.

During semi-automatic operation of the oven, the number of zones being heated and the general speed of the fabric web can be satisfactorily determined from the ready light 188. However, it will be understood that operation of the oven may be facilitated by the provision of suitable thermostats, tachometers and tensometers for visually indicating the temperature in each zone, the speed of the web at any instant, and the tension on the cords.

Suitable mechanism may be provided for accurately indicating the amount the cord fabric stretches during the hot stretching process. The position of the dancer roll or the relative speeds of the driving rollers may be used for indicating the stretch but it is preferable to employ more accurate optical measuring means which are not affected by slippage and friction. For example, the stretching of the fabric web could be indicated by the use of radioactive optical methods or other accurate measuring methods.

The relay $R_1$, like the relays $R_3$ to $R_6$, could be placed in series with a voltage-sensitive meter relay similar to the relays 177 to 181 so that the first zone is cooled automatically in response to slowing down or stopping of the motor 11. Also the relay $R_2$ could be placed in series with the thermostatically operated switch 165 and the relay $R_A$ omitted. However, it is preferable to provide the relay $R_A$ so that the fabric web cannot be moved until the first zone is heated. It is also preferable to supply heated gases to the first zone at all times unless the oven is shut down.

As herein shown, the relay $R_1$, cannot be de-energized merely by pushing the slow push button 194 and is usually not de-energized unless use of the oven is temporarily discontinued. However, suitable means, such as the switch 153, may be provided to effect de-energization of the relay $R_1$ and cooling of the first zone so that the flow of the fabric web W may be stopped without overheating the web.

When the rheostat 39 is adjusted to energize the field windings 40 of the main generator so as to cause flow of the fabric web through the oven, the motors 11 and 26 receive energy proportional to the field excitation of the main generator. However, the pull rolls motor 26 receives additional energy from the booster generator in proportion to the force applied to the dancer roll by the hydraulic motor unit 33.

At any time during the treatment of the fabric web, a predetermined constant hydraulic pressure may be applied to the ram or piston of the unit 33 so as to apply a predetermined force to the dancer roll 31 to bias the same in the upward direction. However, upward movement of the dancer roll causes rotation of the pulley 41 and adjustment of the rheostat 37 in a direction to increase the current supplied to the booster generator 35. The energy output of the booster generator and the speed of the pull rolls motor 26 will increase until sufficient tension is applied to the fabric web to balance the force applied by the hydraulic unit 33. Thus where the unit 33 applies a predetermined constant force of 20,000 pounds, the pull rolls motor 26 will automatically operate at sufficient speed to maintain a tension of 10,000 pounds in the fabric web W. If the web stretches 20% when heated and subjected to this tension, the pull rolls motor 26 will normally operate 20% faster than the saturator motor 11 regardless of the speed of the motor 11. When the motor 11 is slowed down or stopped by depressing the slow push button 194, the motor 26 will also be slowed down or stopped due to the resulting gradual adjustment of the rheostat 37 and the decrease in the energy supplied by the main generator 34.

Each of the thermostatically controlled fuel valves 102 may be adjusted to maintain the hot gases leading to each of the six heating zones at any desired constant temperature (a temperature preferably of from 380° to 425° F. where polyhexamethylene adipamide is being treated) and each of the thermostatically controlled switches 165 to 170 may be adjusted to close at any desired minimum temperature in its respective heating zone (the minimum temperature preferably being above 300° F. where said adipamide is being treated). The voltage sensitive meter relays 177 to 181, may be adjusted to energize the relays $R_2$ to $R_6$, respectively, at main generator voltages corresponding to fabric web speeds of about 30, 60, 90, 120 and 150 feet per minute and the maximum speed position of the rheostat 39 may be adjusted so that the maximum speed of the fabric web is about 180 feet per minute whereby 840/2 denier polyhexamethylene adipamide cords may be treated with high velocity combustion gases at a predetermined temperature of about 375° to 425° F., for a predetermined time of about 18 to 20 seconds while being subjected to the desired tension which for this particular cord would be about 5 to 5½ pounds per cord. If desired the temperature of the gases may be reduced to below 300° F. and the drying time correspondingly increased. Likewise, the temperature of the combustion gases could be increased to decrease the time required for hot stretching although gas temperatures above 450° F are undesirable and impractical.

As an illustrative example, the oven shown herein is adapted to treat a conventional weak-weft fabric web having a normal width of about 60 inches and containing about 1800 or 1900 strong 840/2 denier polyhexamethylene adipamide cords. Sufficient pressure may be applied to the piston of the hydraulic unit 33 so that a predetermined constant tension of from about 5 to 5½ pounds is applied to each of the nylon cords of such web. This will stretch the fabric web during heating thereof in the oven about 15%, will reduce the width of the web about four inches, and will cause uneven spacing of the nylon cords.

It is to be understood that in accordance with the provisions of the patent statutes, variations and modifications of the specific devices herein shown and described may be made without departing from the spirit of the invention.

Having described our invention, we claim:

1. A method of treating fiber cords arranged in parallel relationship in a weak-weft fabric web of uniform width comprising the steps of suspending the web on a pair of parallel cylindrical rollers spaced apart a distance of at least twenty feet, the portion of said web between said rollers being out of contact with solid material and being supported solely by said rollers, moving the web over said rollers at a predetermined velocity while simultaneously applying a predetermined tension to the web to stretch the same substantially straight between said rollers, supplying hot gases at a predetermined temperature to a predetermined number of zones between said rollers and directing said hot gases at high velocity over said cords, supplying air at high velocity to each of said zones rapidly to purge the same of hot gases whenever the supply of hot gases to that zone is discontinued so that the cords are not overheated when the speed thereof is reduced, progressively and sequentially increasing the number of zones being heated, determining the temperature in each zone and the speed of the fabric web, and increasing the speed of the web in increments proportional to the length of the heated zones while correlating the number of the heated zones and the speed of the fabric so that the length of time each portion of the web is heated is maintained substantially constant, the speed of the fabric being increased only when the ratio of the length of the web heated at any instant to the speed of the web is above a predetermined minimum value.

2. A mtehod as defined in claim 1 wherein the number of zones being heated is increased only when said last-named ratio is below a predetermined maximum value.

3. An oven for the treatment of fiber cords arranged in parallel relation in a fabric web comprising means forming two adjacent heating zones, means forming a combustion chamber, means for supplying air to said combustion chamber, means for supplying fuel to said combustion chamber, means including a motor-driven blower for supplying air to said zones, means including a plurality of parallel rollers for supporting said web in said adjacent heating zones and for applying a tension to the fabric to stretch the same, at least about 10 percent, a plurality of nozzles, one in each of said zones for directing gases onto said web, a conduit leading to each of said nozzles from said blower and said combustion chamber for supplying air to said nozzles and for supplying combustion gases to said nozzles when the air supply thereto is discontinued, valve means in said conduit having a heating position preventing communication between the blower and the nozzles while establishing communication between the combustion chamber and the nozzles and having a cooling position establishing communication between the blower and the nozzles while preventing communication between the combustion chamber and the nozzles, variable-speed motor means for rotating said rollers to move said web through said zones at a predetermined velocity, means to vary the speed of said motor means, and means responsive to a temperature in one of said zones for automatically preventing increase in the speed of said motor means beyond a predetermined amount when the temperature in that zone is below a predetermined minimum so as to insure adequate heating of the fabric web as a greater number of heating zones are put into operation.

4. An oven for treating fiber cord comprising means forming a plurality of consecutive heating zones, means for heating said zones to a predetermined temperature comprising a plurality of combustion chambers, means for cooling said zones with air comprising a plurality of blowers, means including a plurality of parallel cylindrical rollers for supporting a fabric web in said zones and for applying substantial tension to the web to stretch the same at least about 10 percent, a plurality of nozzles, one leading from one of said blowers and one of said combustion chambers to each of said nozzles, valve means associated with each of said conduits having a first position for establishing communication between the combustion chamber and the heating zone while simultaneously cutting off communication between said zone and the blower and a second position cutting off communication between the combustion chamber and the heating zone while simultaneously establishing communication between said zone and the blower, means including a variable-speed motor for rotating said rollers to move said web through said heating zones at one of a plurality of predetermined velocities, means for varying the speed of said motor, means for operating said valve means to vary the number of zones being heated, and means responsive to the temperatures in said zones for automatically limiting the speed of said motor to insure adequate heating of the fabric web.

5. An apparatus for the treatment of fiber cords comprising means forming a plurality of heating zones, means including a plurality of parallel rollers for drivingly supporting in said zones a plurality of said cords arranged in parallel relation in a continuous fabric web, means including a variable speed motor for driving said rollers and the web carried thereby at a plurality of predetermined speeds, means for supplying hot gases at high velocity to the web in said zones, means for heating said gases to a temperature within a predetermined range, control means for said motor for varying the speed of the web through the heating zones, means responsive to the temperature in one of said zones for actuating the control means to effect a change in the speed of the web, said control means including means for preventing a further change in the web speed until the temperature in another of said zones is within a predetermined range.

6. An apparatus for the treatment of fiber cords comprising means forming a plurality of heating zones of small volumetric content, means for supplying hot gases at high velocity to each of said zones to heat the same, means including a burner for heating said gases to a predetermined temperature, means including a motor-driven blower for supplying cooling air at high velocity to each of said zones to rapidly cool the same, means including a plurality of parallel cylindrical rollers for drivingly supporting in said heating zones a plurality of said cords arranged in parallel relation in a continuous fabric web, motor means for driving said rollers at a plurality of predetermined speeds, the rollers downstream of said heating zones being driven by said motor means proportionally faster than the rollers upstream of said heating zones so as to apply a predetermined tension to the fabric web in said heating zones to stretch the same during heating and cooling thereof, means for selectively controlling the delivery of said hot gases or cooling air to each of said zones so as to initiate the supply of hot gases while simultaneously discontinuing the supply of cooling air to the zone or vice versa whereby the number of zones being heated and the number being cooled may be varied, control means for said motor means for causing driving of said rollers and the fabric web driven thereby at a speed proportional to the number of said zones being heated by said gases so that the febric web may be heated for a predetermined time by hot gases substantially at said predetermined temperature and means associated with each of said zones for automatically limiting the speed of said rollers and for preventing increase in the speed of the motor means by said control means when the temperature of its associated zone is below a predetermined minimum value so as to insure adequate heating of the fabric web, and means responsive to a temperature in each of said zones within a predetermined range for rendering the speed limiting means in that zone ineffective whereby the speed of travel of the fabric web may be increased when the number of zones heated is increased.

7. A drying oven for treating fiber cords comprising means forming a plurality of successive heating zones, means including a plurality of parallel cylindrical rollers for supporting said cords in said zones, driving means including a variable-speed motor for driving said rollers and the cords supported thereby and for applying tension to said cords as they travel through said zones, means for heating each of said zones including heater means for selectively supplying heat to one zone or to that zone and the next adjacent zone downstream thereof so as to heat the cords passing therethrough whereby the number of zones being heated may be varied, motor control means for selectively increasing or decreasing the speed of said motor, a main control means for temporarily preventing change in the speed of said motor by said motor control means, means responsive to the speed of said motor for automatically controlling said heater means to initiate heating of said one zone when said motor speed exceeds a first predetermined speed substantially proportional to the number of said heating zones upstream of said one zone and to discontinue heating of that zone when said speed falls substantially below that predetermined speed, means responsive to the speed of said motor for automatically controlling said heater means to initiate heating of said adjacent zone when said speed exceeds a second predetermined speed substantially proportional to the number of said heating zones upstream of said adjacent zone and to discontinue heating of that zone when said speed falls substantially below said second predetermined speed, means responsive to the speed of said motor and to the temperature in said one zone for automatically rendering said main control means ineffective to prevent operation of said motor control means when said temperature is within a predetermined range and said speed is below a predetermined speed substantially proportional to the number of zones upstream of said adjacent zone, and means responsive to the speed of said motor and to the temperature of said adjacent zone for automatically rendering said main control means ineffective when said last-named temperature is within said predetermined range and said motor speed is below a predetermined speed substantially proportional to said last-named number of zones plus one whereby the length of time said cords are heated to temperatures within said range may be maintained substantially constant after the number of zones being heated is increased or decreased.

8. A drying oven for treating fiber cords comprising means forming a plurality of successive heating zones, means including a plurality of parallel cylindrical rollers for supporting said cords in said zones, driving means including a variable speed motor for driving said rollers and the cords supported thereby and for applying tension to said cords as they travel through said zones, means for heating each of said zones including heater means for supplying heat selectively to one zone or to that zone and the next adjacent zone downstream thereof so as to heat said cords whereby the number of zones being heated may be varied, motor control means for selectively increasing or decreasing the speed of said motor, a main control means for temporarily preventing change in the speed of said motor by said motor control means, means responsive to said motor speed and to the temperature in said one zone for automatically rendering said main control means ineffective to prevent change in said motor speed when said temperature is within a predetermined temperature range and when said motor speed is below a first predetermined speed, and means responsive to said motor speed and to the temperature in said adjacent zone for automatically rendering said main control means ineffective when said last-named temperature is within said range and when said motor speed is below a second predetermined speed higher than said first predetermined speed so that the motor speed is automatically correlated with the number of zones heated to a temperature within said range.

9. An oven for treating cords of continuous length comprising means forming a plurality of successive heating zones, means including rollers for supporting said cords in said zones, driving means including a variable speed motor for driving said rollers and the cords supported thereon and for applying a tension to said cords as they pass through all of said zones, means for heating said zones and for varying the number of zones being heated, speed control means for selectively increasing or decreasing the speed of said motor and the speed of travel of the cords driven thereby, main control means for temporarily maintaining a constant motor speed by preventing change therein by said speed controls means, and means for automatically correlating the motor speed and the number of zones being heated comprising means associated with each of said zones responsive to said motor speed and to the temperature in its respective zone for automatically rendering said main control means ineffective to prevent change in motor speed when said temperature is within a predetermined range and said motor speed is below a predetermined speed.

10. An oven for treating cords of continuous length comprising means forming a plurality of successive heating zones, means including rollers for supporting said cords in said zones, driving means including a variable speed motor for driving said rollers and the cords supported thereon and for applying a tension to said cords as they pass through all of said zones, means for heating said zones and for varying the number of zones being heated, speed control means for selectively increasing or decreasing the speed of said motor and the speed of travel of the cords driven thereby, main control means for temporarily maintaining a constant motor speed by preventing change therein by said control means, means for initiating heating of the first of said zones traversed by said cords, means responsive to the temperature in said first zone for automatically rendering said main control means ineffective to prevent change in motor speed when said temperature is within a predetermined range, means responsive to the speed of said motor for automatically restoring the effectiveness of said main control means and for initiating heating of the next adjacent zone when said motor speed is above a predetermined speed, means responsive to the temperature in said adjacent zone for automatically removing the effectiveness of said main control means when the last-named temperature is within said range, and means responsive to motor speed for restoring the effectiveness of said main control means when said motor speed is above a predetermined speed, said predetermined speeds being substantially proportional to the length of the zones being heated so that motor speed is correlated with the length of the cords being heated at any instant.

11. An oven for the treatment of fiber cords or the like arranged in parallel spaced relationship in a fabric web of uniform width, said oven comprising a plurality of parallel cylindrical rollers for driving and supporting said web and for stretching the web during movement thereof over the rollers, variable speed motor means for driving said rollers at a plurality of preselected speeds, control means for said motor means for preselecting said speeds, means for directing hot gases at high velocity over said web to heat the same, means for varying the length of the web heated by the hot gases at any instant, means responsive to the temperature of the hot gases at a plurality of spaced points near the web for determining the length of the web being heated by the hot gases at any instant, means responsive to the speed of the rollers for determining the speed of the web being heated, and means operatively connected to said speed and temperature responsive means for automatically preventing an increase in the speed of said motor means by said control means when the ratio of the length of the web being heated at any instant to the speed of the web is below a predetermined minimum value so as to insure heating of the web for an adequate time.

12. An apparatus for the treatment of fiber cords comprising means forming a heating zone, means for supplying hot gases at high velocity to said zone to heat the same, means including a plurality of parallel cylindrical rollers for drivingly supporting in said heating zone a plurality of said cords arranged in parallel relation in a continuous fabric web, variable-speed motor means for driving said rollers and the web carried thereby, means for varying the length of the heating zone and the volume of hot gases supplied thereto, means responsive to the temperature at a plurality of spaced points along the length of said heating zone for determining the length of said heating zone and the length of the web being heated at any instant in said zone, and means controlled by the temperature responsive means for controlling the motor means to maintain the speed of the fabric web proportional to the length of said zone so that the length of time the web is heated is maintained within a predetermined range.

13. An oven as defined in claim 12 wherein a cooling zone is provided adjacent said heating zone to cool said cords as they leave said heating zone, and wherein means is provided for varying the length of said cooling zone as the length of said heating zone is varied to maintain the total of said lengths constant.

14. An oven for treating fiber cords arranged in parallel relationship in a weak-weft fabric web of uniform width, said oven comprising fabric supporting means including a pair of parallel cylindrical rollers spaced apart a distance of at least twenty feet, said web being supported by said rollers, the portion of said web between said rollers being out of contact with solid material and being supported solely by said rollers, motor means for causing said web to move over said rollers at a predetermined velocity while simultaneously applying a predetermined tension to the web to stretch the same substantially straight between said rollers, means forming a plurality of heating zones of small volumetric content between said rollers to heat the fabric web, means for supplying hot gases at a predetermined temperature to a predetermined number of said zones and for directing said gases over said cords at high velocity, means for supplying air at high velocity to each of said zones rapidly to purge the same of hot gases when the supply of hot gases to that zone is discontinued so that the cords are not overheated when the speed thereof is reduced, temperature control means for progressively and sequentially increasing the number of zones being heated, means in each zone responsive to the temperature in that zone for determining when that temperature is above a predetermined value, means responsive to the speed of the fabric web for determining said speed, motor control means for increasing the speed of the fabric web in increments proportional to the length of the heated zones and for correlating the number of the heated zones and the speed of the fabric so that the length of time each portion of the web is heated is maintained substantially constant, and means operatively connected to said speed and temperature responsive means for automatically preventing an increase in the speed of said motor means by said motor control means when the ratio of the length of the web heated at any instant to the speed of the web is below a predetermined minimum value so as to insure heating of the web for an adequate time.

15. An oven as defined in claim 14 wherein the means for preventing an increase in the speed of said web is operatively connected to said temperature control means and prevents an increase in the number of zones being heated when said last-named ratio is below a predetermined maximum value.

References Cited in the file of this patent
UNITED STATES PATENTS

| | | |
|---|---|---|
| 92,210 | Richardson | July 6, 1869 |
| 1,261,343 | Barber | Apr. 2, 1918 |
| 1,543,368 | Carrier | June 23, 1925 |
| 1,726,134 | Alexander | Aug. 27, 1929 |
| 1,773,642 | Roberts | Aug. 19, 1930 |
| 2,077,492 | Ritzert | Apr. 20, 1937 |
| 2,339,323 | Feild | Jan. 18, 1944 |
| 2,343,351 | Wedler | Mar. 7, 1944 |
| 2,364,135 | Finlayson | Dec. 5, 1944 |
| 2,514,187 | Bosomworth | July 4, 1950 |
| 2,532,032 | Offen | Nov. 28, 1950 |
| 2,666,994 | Dungler | Jan. 26, 1954 |
| 2,668,700 | Zimmerman | Feb. 9, 1954 |
| 2,671,969 | Mayer | Mar. 16, 1954 |
| 2,706,690 | Deniston | Apr. 19, 1955 |